US012682298B2

(12) United States Patent
Villa et al.

(10) Patent No.: US 12,682,298 B2
(45) Date of Patent: Jul. 14, 2026

(54) PAYLOAD MANAGEMENT FOR VERTICAL TAKE-OFF AND LANDING AIRCRAFT UTILIZING GROUND TRANSPORTATION

(71) Applicant: Joby Aero, Inc., Santa Cruz, CA (US)

(72) Inventors: Ian Andreas Villa, San Francisco, CA (US); John Conway Badalamenti, Six Mile, SC (US); Mark Moore, Crossville, TN (US); Adam Warmoth, Los Angeles, CA (US)

(73) Assignee: JOBY AERO, INC., Santa Cruz, CA (US)

( * ) Notice: Subject to any disclaimer, the term of this patent is extended or adjusted under 35 U.S.C. 154(b) by 0 days.

(21) Appl. No.: 18/950,347

(22) Filed: Nov. 18, 2024

(65) Prior Publication Data

US 2025/0148393 A1     May 8, 2025

Related U.S. Application Data

(63) Continuation of application No. 17/461,140, filed on Aug. 30, 2021, now abandoned.

(Continued)

(51) Int. Cl.
*G06Q 10/0631* (2023.01)
*B64C 29/00* (2006.01)
(Continued)

(52) U.S. Cl.
CPC ... *G06Q 10/06315* (2013.01); *B64C 29/0008* (2013.01); *G06Q 10/08* (2013.01);
(Continued)

(58) Field of Classification Search
CPC .. G06Q 10/06315; G06Q 50/40; G06Q 10/08; G06Q 10/083; G06Q 10/08345;
(Continued)

(56) References Cited

U.S. PATENT DOCUMENTS

| | | | |
|---|---|---|---|
| 3,035,789 A | 5/1962 | Young | |
| 4,022,405 A | 5/1977 | Peterson | |

(Continued)

FOREIGN PATENT DOCUMENTS

| | | |
|---|---|---|
| EP | 0945841 A1 | 9/1999 |
| EP | 2698749 A1 | 2/2014 |

(Continued)

OTHER PUBLICATIONS

Meincke et al., "Concepts for Cargo Ground Handling of Unmanned Cargo Aircrafts and Their Influence on the Supply Chain," 2018 8th International Conference on Logistics, Informatics and Service Sciences (LISS), Toronto, ON, Canada, 2018, pp. 1-10, doi: 10.1109/LISS.2018.85 (Year: 2018).*

(Continued)

*Primary Examiner* — George Chen
*Assistant Examiner* — Tayar M Kyu
(74) *Attorney, Agent, or Firm* — Dority & Manning, P.A.

(57)     ABSTRACT

The present application describes a payload management system that routes a payload item associated with an individual from an origin to a destination. In some examples, the payload item is routed from the origin to the destination separate from a travel itinerary associated with the individual. For example, the payload item can be routed via a vehicle other than a VTOL aircraft that is assigned to the individual for a multi-modal transportation service.

20 Claims, 9 Drawing Sheets

Related U.S. Application Data

(60) Provisional application No. 63/071,849, filed on Aug. 28, 2020.

(51) Int. Cl.

| | |
|---|---|
| *G06Q 10/08* | (2024.01) |
| *G06Q 10/083* | (2024.01) |
| *G06Q 10/0834* | (2023.01) |
| *G06Q 30/0283* | (2023.01) |
| *G06Q 50/40* | (2024.01) |

(52) U.S. Cl.
 CPC ..... *G06Q 10/083* (2013.01); *G06Q 10/08345* (2013.01); *G06Q 30/0284* (2013.01); *G06Q 50/40* (2024.01)

(58) Field of Classification Search
 CPC .... G06Q 30/0284; G06Q 50/28; G06Q 50/30; B64C 29/0008
 See application file for complete search history.

(56) References Cited

U.S. PATENT DOCUMENTS

| | | | |
|---|---|---|---|
| 5,823,468 A | 10/1998 | Bothe | |
| 5,839,691 A | 11/1998 | Lariviere | |
| 5,842,667 A | 12/1998 | Jones | |
| 6,343,127 B1 | 1/2002 | Billoud | |
| 6,892,980 B2 | 5/2005 | Kawai | |
| 8,016,226 B1 | 9/2011 | Wood | |
| 8,020,804 B2 | 9/2011 | Yoeli | |
| 8,311,686 B2 | 11/2012 | Herkes et al. | |
| 8,733,690 B2 | 5/2014 | Bevirt et al. | |
| 8,737,634 B2 | 5/2014 | Brown et al. | |
| 8,849,479 B2 | 9/2014 | Walter | |
| 9,205,930 B2 | 12/2015 | Yanagawa | |
| 9,387,928 B1 | 7/2016 | Gentry et al. | |
| 9,415,870 B1 | 8/2016 | Beckman et al. | |
| 9,422,055 B1 | 8/2016 | Beckman et al. | |
| 9,435,661 B2 | 9/2016 | Brenner et al. | |
| 9,442,496 B1 | 9/2016 | Beckman et al. | |
| 9,550,561 B1 | 1/2017 | Beckman et al. | |
| 9,561,860 B2 | 2/2017 | Knapp et al. | |
| 9,663,237 B2 | 5/2017 | Senkel et al. | |
| 9,694,911 B2 | 7/2017 | Bevirt et al. | |
| 9,697,737 B2 | 7/2017 | Hale et al. | |
| 9,771,157 B2 | 9/2017 | Gagne et al. | |
| 9,786,961 B2 | 10/2017 | Dyer et al. | |
| 9,802,702 B1 | 10/2017 | Beckman et al. | |
| 9,813,510 B1 | 11/2017 | Nickels et al. | |
| 9,816,529 B2 | 11/2017 | Grissom et al. | |
| 9,817,400 B1 | 11/2017 | Poeppel et al. | |
| 9,838,436 B2 | 12/2017 | Michaels | |
| 9,857,190 B2 | 1/2018 | Marueli et al. | |
| 10,140,873 B2 | 11/2018 | Adler et al. | |
| 10,144,504 B1 | 12/2018 | Selwa et al. | |
| 10,152,894 B2 | 12/2018 | Adler et al. | |
| 10,180,331 B2 | 1/2019 | Hajj et al. | |
| 10,216,190 B2 | 2/2019 | Bostick et al. | |
| 10,217,069 B2 | 2/2019 | Scicluna | |
| 10,249,200 B1 | 4/2019 | Grenier et al. | |
| 10,304,344 B2 | 5/2019 | Moravek et al. | |
| 10,330,482 B2 | 6/2019 | Chen et al. | |
| 10,345,117 B2 | 7/2019 | O'Beirne et al. | |
| 10,495,478 B2 | 12/2019 | O'Beirne et al. | |
| 10,567,520 B2 | 2/2020 | Sweeney et al. | |
| 10,593,215 B2 | 3/2020 | Villa | |
| 10,593,217 B2 | 3/2020 | Shannon | |
| 10,752,365 B2 | 8/2020 | Galzn | |
| 10,759,537 B2 | 9/2020 | Moore et al. | |
| 10,768,201 B2 | 9/2020 | Luo et al. | |
| 10,832,581 B2 | 11/2020 | Westervelt et al. | |
| 10,836,470 B2 | 11/2020 | Liu et al. | |
| 10,913,528 B1 | 2/2021 | Moore et al. | |
| 10,948,910 B2 | 3/2021 | Taveira et al. | |
| 10,960,785 B2 | 3/2021 | Villanueva et al. | |
| 11,130,566 B2 | 9/2021 | Mikic et al. | |
| 11,145,211 B2 | 10/2021 | Goel et al. | |
| 11,238,745 B2 | 2/2022 | Villa et al. | |
| 11,295,622 B2 | 4/2022 | Goel et al. | |
| 2004/0078210 A1 | 4/2004 | Segelbaum | |
| 2009/0119135 A1 | 5/2009 | Schoeman et al. | |
| 2010/0079342 A1 | 4/2010 | Smith et al. | |
| 2012/0239452 A1 | 9/2012 | Trivedi et al. | |
| 2014/0173511 A1 | 6/2014 | Lehmann et al. | |
| 2014/0179535 A1 | 6/2014 | Stückl et al. | |
| 2014/0207375 A1 | 7/2014 | Lerenc | |
| 2015/0279217 A1* | 10/2015 | Chen ................. G06Q 10/0631 701/123 | |
| 2015/0323330 A1 | 11/2015 | Lord et al. | |
| 2015/0323331 A1 | 11/2015 | Lord et al. | |
| 2015/0371204 A1 | 12/2015 | Balda et al. | |
| 2016/0132792 A1 | 5/2016 | Rosnow | |
| 2016/0231129 A1 | 8/2016 | Erez et al. | |
| 2016/0311529 A1 | 10/2016 | Brotherton-Ratcliffe et al. | |
| 2016/0321771 A1 | 11/2016 | Liu et al. | |
| 2016/0364679 A1 | 12/2016 | Cao | |
| 2016/0364823 A1 | 12/2016 | Cao | |
| 2017/0129603 A1* | 5/2017 | Raptopoulos ............. B64F 1/22 | |
| 2017/0197710 A1 | 7/2017 | Ma | |
| 2017/0357914 A1 | 12/2017 | Tulabandhula et al. | |
| 2018/0018887 A1 | 1/2018 | Sharma et al. | |
| 2018/0053425 A1 | 2/2018 | Adler et al. | |
| 2018/0216988 A1 | 8/2018 | Nance | |
| 2018/0308366 A1 | 10/2018 | Goel et al. | |
| 2018/0354636 A1 | 12/2018 | Darnell et al. | |
| 2019/0146508 A1 | 5/2019 | Dean et al. | |
| 2019/0221127 A1* | 7/2019 | Shannon ................. G06Q 50/40 | |
| 2019/0236743 A1 | 8/2019 | Bonanni et al. | |
| 2019/0315471 A1 | 10/2019 | Moore | |
| 2019/0316849 A1 | 10/2019 | Abrego et al. | |
| 2019/0318277 A1 | 10/2019 | Goldman | |
| 2019/0325538 A1 | 10/2019 | Savian | |
| 2019/0325757 A1 | 10/2019 | Goel | |
| 2020/0103922 A1 | 4/2020 | Nonami et al. | |
| 2020/0182637 A1 | 6/2020 | Kumar et al. | |
| 2020/0388166 A1 | 12/2020 | Rostamzadeh et al. | |
| 2021/0065111 A1 | 3/2021 | Smith et al. | |

FOREIGN PATENT DOCUMENTS

| | | | |
|---|---|---|---|
| EP | 3499634 A1 | 6/2019 | |
| JP | 2010095246 A | 4/2010 | |
| JP | 2013086795 A | 5/2013 | |
| WO | WO 2018023556 A1 | 2/2018 | |
| WO | WO 2019089677 A1 | 5/2019 | |
| WO | WO 2020252024 A1 | 12/2020 | |

OTHER PUBLICATIONS

Bennaceur et al., "Passenger-centric urban air mobility: Fairness trade-offs and operational efficiency" Transportation Research: Emerging Technologies, 2021, 29 pages.

Jong, "Optimizing cost effectiveness and flexibility of air taxis: A case study for optimization of air taxi operations", University of Twente, Master's thesis, 2007, 62 pages.

Miao et al., "Data-driven robust taxi dispatch under demand uncertainties", IEEE Transactions on Control Systems Technology 27, No. 1, 2017, 16 pages.

Miao et al., "Taxi dispatch with real-time sensing data in metropolitan areas: A receding horizon control approach", In Proceedings of the ACM/IEEE Sixth International Conference on Cyber-Physical Systems, 2015, 15 pages.

Uber, "Fast-forwarding to a future of on-demand urban air transportation", 2016, 99 pages.

\* cited by examiner

PAYLOAD MANAGEMENT FOR VERTICAL TAKE-OFF AND LANDING AIRCRAFT UTILIZING GROUND TRANSPORTATION

RELATED APPLICATIONS

The present application is a continuation of U.S. Non-provisional patent application Ser. No. 17/461,140 (filed Aug. 30, 2021), which is hereby incorporated by reference herein in its entirety. U.S. Non-provisional patent application Ser. No. 17/461,140 claims priority to U.S. Provisional Patent Application No. 63/071,849 (filed Aug. 28, 2020), which is hereby incorporated by reference herein in its entirety.

FIELD

The present disclosure relates generally to facilitating multi-modal transportation services for riders. More particularly, the present disclosure relates to systems and methods for facilitating multi-modal transportation services via payload redistribution.

BACKGROUND

A transportation service entity may use a fleet of aerial vehicles for transporting individuals from various origins to various destinations. However, each aerial vehicle in the fleet may have specific maximum weight thresholds that must be adhered to during operation.

SUMMARY

The present application describes a payload management system for aerial vehicles. In some examples, the aerial vehicles described herein are vertical or short take-off and landing aircraft referred to collectively herein as VTOL aircraft. This can include electric and/or hybrid propulsion VTOL aircraft. Although VTOL aircraft are specifically mentioned, the methods and systems described herein may be utilized by any system and/or aircraft for which payload restrictions and/or guidelines are associated.

The payload management system of the present application accesses data indicative of an itinerary. The data indicative of the potential itinerary request can be received from a computing device associated with an individual and/or an intermediate computing system. The data indicative of the potential itinerary request may include an origin, a destination, and payload information associated with the individual. When this information is received, the payload management system may determine whether a payload item (e.g., luggage) associated with the individual would cause a maximum weight threshold of a VTOL aircraft associated with an identified itinerary to be exceeded. If so, the payload management system may provide the individual with one or more alternate itineraries. In one example, an alternate itinerary is one in which the payload item is transported from an origin to a destination in a vehicle other than the one that is transporting the individual. For example, the payload item may be transported from the origin to the destination in a ground vehicle. In some examples, both the VTOL aircraft and the ground vehicle are provided by one or more ride-sharing services.

In one example aspect, the present application describes a method for routing payload items and includes accessing, by a computing system including one or more computing devices, data indicative of a potential itinerary request for a vertical take-off and landing (VTOL) aircraft and payload information associated with an individual. The data indicative of the potential itinerary request specifies an origin and a destination. The data indicative of the potential itinerary request is associated with a computing device of an individual. The method also includes determining, based at least in part on the data indicative of the potential itinerary request and the payload information, a potential itinerary and an associated VTOL aircraft, wherein the VTOL aircraft is associated with transporting the individual. The method also includes providing, by the computing system for display via the computing device, data indicative of the potential itinerary. The data indicative of the potential itinerary includes payload routing information for routing a payload item associated with the payload information from the origin to the destination using a vehicle other than the associated VTOL aircraft.

In another example aspect, the present application describes a system that includes a processor and a memory communicatively coupled to the processor. The memory stores instructions that, when executed by the processor, perform operations. These operations include accessing data indicative of a potential itinerary request for an aircraft and payload information associated with an individual. The data indicative of the potential itinerary request includes an origin and a destination. The operations include determining a first itinerary for the individual. The first itinerary is associated with a particular aircraft and is based, at least in part, on the origin, the destination and the payload information. The operations include determining a second itinerary for the individual. The second itinerary includes payload routing information for routing a payload item associated with the payload information. The payload item may be routed from a first location to a second location using a vehicle other than the particular aircraft. The operations further include providing, for display via a user interface of a computing device associated with the individual, at least one of the first itinerary or the second itinerary.

In yet another example aspect, the present application describes one or more non-transitory computer readable media. The media can store instructions that, when executed by one or more computing devices, cause the one or more computing devices to perform operations. These operations include accessing information associated with an individual and payload information associated with the individual. The operations include determining an itinerary associated with the individual. In some examples, the itinerary identifies a particular vertical take-off and landing (VTOL) aircraft. The operations include determining whether a payload item associated with the payload information will cause a payload threshold of the particular VTOL aircraft to be exceeded when the payload item is loaded on the particular VTOL aircraft. When it is determined that the payload item associated with the payload information will cause the payload threshold of the particular VTOL aircraft to be exceeded, the operations can include providing, for display via a user interface of a computing device associated with the individual, routing information for the payload item. In some examples, the routing information includes information regarding how the payload item will be routed to a destination on a vehicle other than the particular VTOL aircraft.

DETAILED DESCRIPTION

Figure 1A:
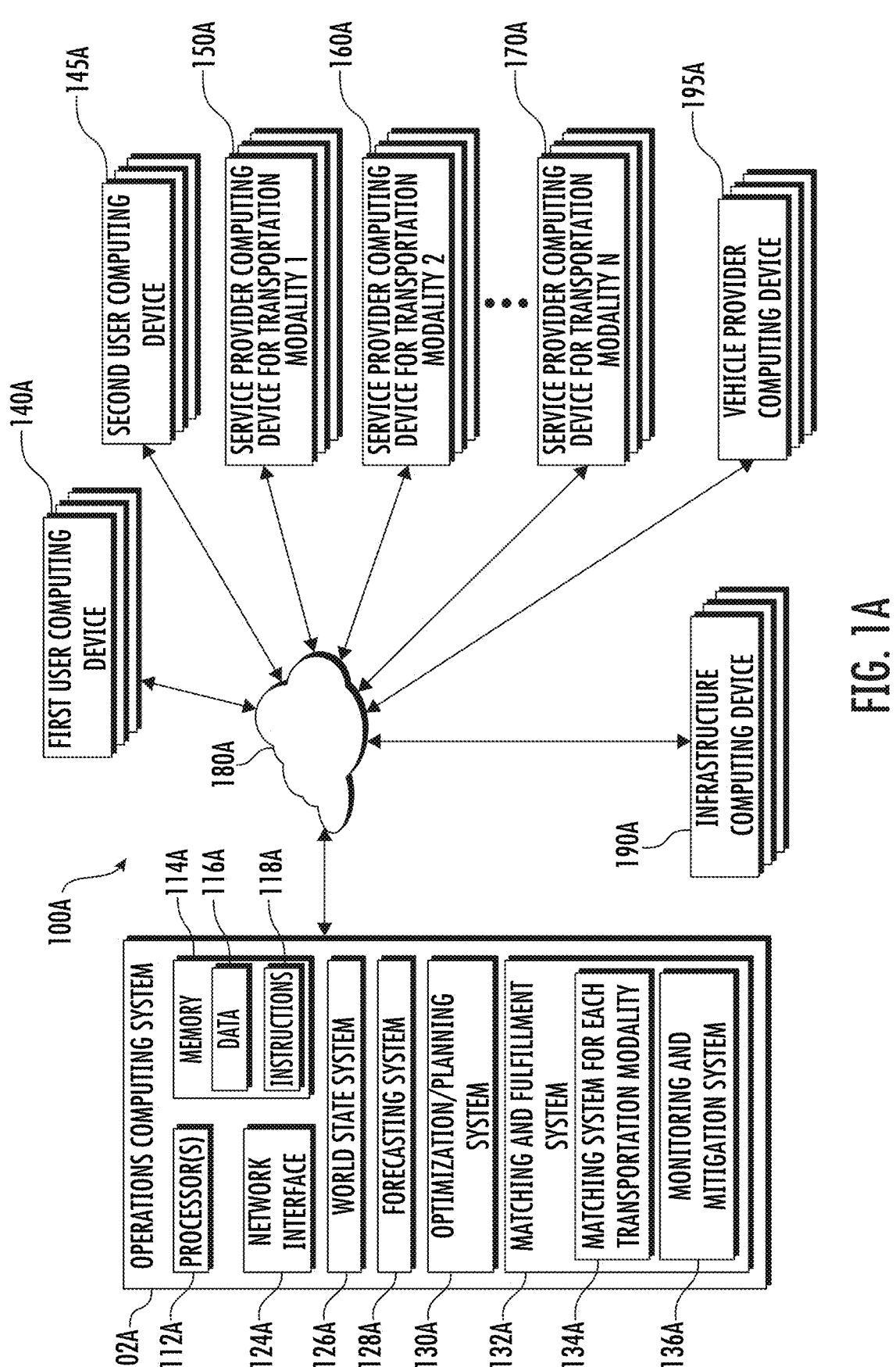
FIG. 1A depicts a block diagram of an example computing system according to example implementations of the present disclosure.

A transportation service entity may use a fleet of aerial vehicles to transport payloads within a transportation network. In the examples set forth below, the aerial vehicles referred to are vertical take-off and landing (VTOL) aircraft. However, other types of aerial vehicles are contemplated.

Each VTOL aircraft in a fleet may have different weight thresholds and/or storage/cargo space. Accordingly, the amount of payload items that can be loaded on a VTOL aircraft may be limited depending on the weight and/or size of each payload item. Additionally, a maximum weight threshold of a particular VTOL aircraft may change or otherwise shift over time. For example, a state of charge of a VTOL aircraft may not only affect the distance that the VTOL aircraft is capable of traveling, but it may also affect a maximum payload weight the VTOL aircraft is able to carry with respect to distance.

As used herein, a "state of charge" of a VTOL aircraft represents the energy that is currently available to the VTOL aircraft. For example, the state of charge represents an amount of energy (e.g., watt hours, voltage, etc.) available for the VTOL aircraft. Depending on the energy type of the VTOL aircraft, the state of charge is determined based on the charge of one or more rechargeable batteries, an amount of fuel remaining in a fuel tank, or a combination thereof. Although state of charge is specifically mentioned, other factors may account for the maximum payload weight of the VTOL aircraft.

A VTOL aircraft can be determined for an individual based on the origin and destination input by an individual. In order to help ensure neither a maximum weight nor a maximum space threshold of a particular VTOL aircraft is not exceeded, the present application describes routing a payload item associated with an individual from an origin (or another location such as, for example, a first vertiport) to a destination (or another location such as, for example, a second vertiport) using a vehicle other than the VTOL aircraft the individual is travelling in. For example, an individual may have booked an itinerary to travel from an origin to a destination on a VTOL aircraft. However, it may be determined (e.g., using received sensor information, historical data, information submitted by the individual) that a payload item (e.g., luggage, a bag, or other cargo) associated with the individual would cause the maximum weight threshold of the VTOL aircraft to be exceeded. In other examples, it may be determined (e.g., using received sensor information, historical data, measurement data, information submitted by the individual) that a volume of the payload item is too large to fit (or unduly restrict other payload items from fitting) in a cargo hold of the VTOL aircraft.

In such examples, the individual is provided (e.g., via a user interface on a computing device) with an option to route the payload item from a designated origin to a designated destination. In some examples, the designated origin is a facility (referred to herein as a "vertiport") from which the VTOL aircraft departs. Likewise, the designated destination may be a vertiport at which the VTOL aircraft lands. In another example, the designated origin and/or the designated destination may be selected by the individual. For example, the individual provides instructions (e.g., via a user computing device) that the payload item be picked up at the individual's home prior to the individual departing to the vertiport. In another example, the individual provides instructions that the payload item be dropped off at a particular location (e.g., a hotel).

As indicated above, the vehicle in which the payload item is routed is different from the VTOL aircraft in which the individual is travelling. In some examples, the vehicle is a ground vehicle such as, for example, an automobile or truck. The vehicle and/or a driver of the vehicle may be associated with a transportation service entity that provides ground and/or aerial transportation for individuals.

Upon being notified that the payload item cannot be transported on the VTOL aircraft with the individual, the individual may be provided with VTOL aircraft and/or ground alternatives. This may include an option for an alternate itinerary that transports the individual from the origin to the destination on a different (or the same) VTOL aircraft at a different time. In particular, the different (or same) VTOL aircraft at a different time can have capacity to transport the individual and the payload item associated with the individual. In another example, other passengers on the VTOL aircraft receive a notification of an opportunity to have their payload items routed from the origin to a specified destination via another vehicle. In particular, the individual can select the option of a different itinerary for transporting their payload items. Even more particularly, the individual selecting the option of a different itinerary for transporting their payload items can allow the payload items to be transported along the user selected different itinerary. In some implementations, the individual may be provided with the option of a different itinerary prior to the individual selecting a travel itinerary for the individual.

In some implementations, a volunteering passenger is provided a benefit (e.g., a discount, a partial refund, or other compensation) for electing to have her payload item routed via a different vehicle than the VTOL vehicle in which the volunteering passenger is to be transported. For instance, an individual can be provided with the option of a different itinerary, payload routing information, for transporting their payload items on a display via a user interface of a user computing device. In particular, the user computing device can display via the user interface cost associated with the payload routing information. An item associated with that individual may not be one that causes the weight capacity of the VTOL vehicle to be exceeded. An item associated with that individual may not be one that causes the size/space capacity of the VTOL vehicle to be exceeded. However, the individual (e.g., a volunteering passenger) can select to have her item (e.g., luggage) transported by the vehicle other than the VTOL vehicle and receive compensation in return. This can include a monetary discount, credit, rating increase, seating preference, voucher, etc. As such, an individual with an item that initially appeared to cause the VTOL vehicle to exceed its weight, space, or size limit can instead have the item transported in the VTOL vehicle.

The transportation service entity may also track in real-time or substantially real-time, a location of the individual simultaneously with a location of the payload item associated with the individual-even when the payload item is on another vehicle. Both the location of the individual as the individual travels from the origin to the destination and the location of the payload item as the payload item travels to the destination of the payload item can be provided to a computing device associated with the individual. Such location information can be tracked by using sensor data acquired by a user device of the individual as well as sensor data acquired by a transportation modality (e.g., ground-based, aerial vehicle, etc.) in which the individual and/or the item is travelling. This sensor data can include GPS data, IMU data, cellular related data, and/or other types of data for location-based tracking and can be used to render a user interface that shows the locations of the individual and the item in a single view. For example, the location of the individual and the location of the payload can be displayed on a user interface leveraged by the computing device associated with the individual. As such, the individual may be able to track the status of her payload item in real-time or substantially real-time to ensure the payload item will arrive at the specified destination.

Example aspects of the present disclosure can provide a number of technical improvements. For example, technical improvements to computing technology such as, for example, multi-modal transportation technology. For instance, the systems and methods of the present disclosure provide an improved approach for allocating VTOL weight and space/size resources. In particular, the systems and methods of the present disclosure can facilitate weight and space/size distribution of users and their associated payloads by providing alternative itineraries for user payloads. By preemptively facilitating weight and space/size distribution by allowing users to select alternative itineraries for user payloads, the computing system can reduce the computing resources expended cancelling, rerouting, or adding entire user routes to accommodate exceeding the VTOL weight or space limit. Thus, by facilitating weight and space distribution of the VTOLs, the computing system can better predict actual VTOL routes, thus minimizing computing resources expended on incorrect VTOL routes.

As another example, technical improvements can include greater VTOL functioning efficiency. By facilitating the weight distributions of VTOLs, the VTOLs can avoid flying over capacity. This, in turn, allows the VTOLs to function more efficiently and use less energy while in transport. The VTOLs functioning more efficiently also allows for VTOLs to fly with less idling. Less idling and less energy used in flight in turn can facilitate the flight itself of the VTOL, to minimize time wasted by the users.

As yet another example, technical improvements can include greater VTOL functioning efficiency. By facilitating the space distribution of VTOLs, the VTOLs can avoid inefficiently using space. This, in turn, allows the VTOLs to require fewer vehicles other than VTOLs to transport individual's payloads. For example, by identifying that a single payload that uses the space of the VTOL ineffectively, the single payload can be directed to be transported by a different vehicle. Instead, multiple alternative payloads that use the space more efficiently can be transported by VTOL.

FIG. 1A depicts a block diagram of an example computing system 100A according to example implementations of the present disclosure. The computing system 100A includes an operations computing system 102A (e.g., a cloud-based operations computing system, etc.) that can operate to plan and fulfill multi-modal transportation service itineraries. The operations computing system 102A can be communicatively connected over a network 180A to a first user device 140A, a second user device 145A, one or more service provider computing devices 150A for a first transportation modality, one or more service provider computing devices 160A for a second transportation modality, one or more service provider computing devices 170A for an Nth transportation modality, one or more infrastructure computing devices 190A, and one or more vehicle provider computing devices 195A.

Each of the computing devices 140A, 150A, 160A, 170A, 190A, 195A can include any type of computing device such as a smartphone, tablet, hand-held computing device, wearable computing device, embedded computing device, navigational computing device, vehicle computing device, laptop, desktop, server system, etc. A computing device can be associated with a computing system. A computing device can include one or more processors and a memory (e.g., similar to as will be discussed with reference to processors 112A and memory 114A). Although service provider devices are shown for N different transportation modalities, any number of different transportation modalities can be used, including, for example, less than the three illustrated modalities (e.g., two modalities can be used).

The operations computing system 102A includes one or more processors 112A and a memory 114A. The one or more processors 112A can be any suitable processing device (e.g., a processor core, a microprocessor, an ASIC, a FPGA, a controller, a microcontroller, etc.) and can be one processor or a plurality of processors that are operatively connected. The memory 114A can include one or more non-transitory computer-readable storage media, such as RAM, ROM, EEPROM, EPROM, one or more memory devices, flash memory devices, etc., and combinations thereof.

The memory 114A can store information that can be accessed by the one or more processors 112A. For instance, the memory 114A (e.g., one or more non-transitory computer-readable storage mediums, memory devices) can store data 116A that can be obtained, received, accessed, written, manipulated, created, and/or stored. In some implementations, the operations computing system 102A can obtain data from one or more memory device(s) that are remote from the operations computing system 102A.

The memory 114A can also store computer-readable instructions 118A that can be executed by the one or more processors 112A. The instructions 118A can be software written in any suitable programming language or can be implemented in hardware. Additionally, or alternatively, the instructions 118A can be executed in logically and/or virtually separate threads on processor(s) 112A. For example, the memory 114A can store instructions 118A that when executed by the one or more processors 112A cause the one or more processors 112A to perform any of the operations and/or functions described herein.

In some implementations, the operations computing system 102A can facilitate the ability of the user to receive transportation on one or more of the transportation legs included in an itinerary. As one example, the operations computing system 102A can implement and/or interact with one or more ride-sharing networks to match the user with one or more transportation service providers 150A, 160A, 170A. As another example, the operations computing system 102A can book or otherwise reserve a seat in, space on, or usage of one or more of the transportation modalities for the user. Additionally, or alternatively, the operations computing system 102A can simply provide information for options to be provided by one or more third parties for one or more of the transportation legs.

More particularly, the operations computing system 102A can be associated with a service entity and be configured to manage, coordinate, and dynamically adjust a multi-modal transportation service via a transportation platform of the service entity. The service entity can include, for example, a transportation network provider. The transportation network provider can be an entity that coordinates, manages, etc. transportation services that include aerial and/or other types of vehicles. The transportation network provider can be associated with one or more transportation platforms. A transportation platform can be utilized for the provision of transportation services via one or more vehicles available, online, etc. to the transportation platform. In some implementations, the vehicles used to provide the transportation services can be owned, operated, leased, etc. by the service entity (e.g., the transportation network provider). Additionally, or alternatively, the vehicles the vehicles used to provide the transportation service be owned, operated, leased, etc. by an entity other than the service entity (e.g., a third-party vehicle provider).

The multi-modal transportation service can include a plurality of transportation legs, one of which (e.g., a second transportation leg) can include an aerial transport of a user (also referred to as an individual, a rider, passenger, etc.). For example, the operations computing system 102A can obtain a request for a transportation service. The request for the transportation service can include at least a request for an aerial transport of a user of a transportation platform. Additionally, or alternatively, the request can be a request for transportation to a destination. One or more candidate transportation options can be evaluated to see what types and/or number of transportation modalities may be available for the user, as further described herein. Transportation via aerial vehicle (for at least a portion of the transport) may be one viable option.

The operations computing system can obtain the request from a first user device 140A associated with the first user of the transportation platform. The first user device 140A, for example, can include any type of computing device such as a smartphone, tablet, hand-held computing device, wearable computing device, embedded computing device, navigational computing device, etc. The first user device 140A can include one or more communication interfaces configured to communicate via network 180A (e.g., via one or more networks such as local area networks, wide area networks, the Internet, secure networks, cellular networks, mesh networks, etc.) with the transportation platform (e.g., operations computing system 102A).

In some implementations, the first user device 140A can generate the request. For instance, the first user device 140A can include a first software application running on the first user device 140A. The first software application, for example, can be associated with the first user and/or the transportation platform. For example, the first user can be associated with an account on the transportation platform and the first software application can allow the first user to book a multi-model transportation service of the service entity using the first user's account (e.g., to facilitate payment, maintain usage history, apply discounts, identify preferences, etc.). The first user can interact with the first software application running on the first user device 140A (e.g., via a user interface) to generate the request for the transportation service.

A transportation platform, for example, can include cloud services system communicatively connected over a network to a plurality of users (e.g., via one or more first user devices 140A, one or more second user device 145A, etc.), a plurality of service providers (e.g., via one or more service provider devices 150A, 160A, 170A, etc.), etc. The transportation platform can be configured to leverage transportation capabilities of the plurality of service providers to schedule and facilitate a multi-modal transportation service for the plurality of users (and/or one or more secondary users associated with the plurality of users). The operations computing system 102A can be configured to coordinate multimodal transportation for the transportation platform.

For example, the operations computing system 102A can respond to a first user's request by determining whether it is better to fulfill the first user's request using a single transportation modality or using multiple transportation modalities. As one example, the operations computing system 102A can evaluate the first user's (and/or a secondary user's) current location, request origin, and/or destination to determine which modalities of transportation are usable at such location (e.g., able to access such locations). For example, the location(s) can be checked against a list of whitelisted locations that have been approved for participation in various types of modalities (e.g., flight modalities for the purpose of generating a multi-modal trip itinerary). As another example, the operations computing system 102A can evaluate (e.g., generate) one or more itineraries that are single-modal and one or more itineraries that a multi-modal (e.g., inclusive of various combinations of different transportation modalities). The operations computing system 102A can compare the generated single- and multi-modal itineraries to determine whether it is appropriate to suggest a single- or multi-modal itinerary to the user (and/or another user for which a transportation service is being coordinated). For example, one or more of the best itineraries (e.g., as evaluated based on various characteristics such as cost, time, etc.) can be suggested to the user. The user can select one of the suggested itineraries to receive transportation services in accordance with the selected itinerary.

In addition, in some implementations, the operations computing system 102A can continually re-evaluate various itineraries (e.g., single- and/or multi-modal itineraries) before and even during completion of a selected itinerary. If an improved itinerary becomes available (e.g., which may include changing from a single-modal itinerary to a multi-modal itinerary if, for example, a seat on a flight becomes available) the operations computing system 102A can suggest the improved itinerary for selection by a user. In some implementations, if the first user selects the improved itinerary during completion of an existing itinerary, the operations computing system 102A can facilitate switching to the updated itinerary, including, for example, re-routing a transportation provider that is currently transporting the user to an alternative, updated destination.

In some implementations, the operations computing system 102A can include and implement logic for handling transportation service provider cancellations and/or inappropriate usage (e.g., "gaming") of the ride sharing network by the transportation service provider. As one example, in the event of a service provider cancellation or if the service provider is not making substantial progress toward fulfilling the requested, the operations computing system 102A can automatically prompt a re-handling of the user's request (e.g., re-match to a different service provider but using the same itinerary). Alternatively, or additionally, the operations computing system 102A can automatically create a new request and perform the itinerary creation process an additional time (e.g., in the case that leg(s) of the original itinerary are accepted by a matched service provider but not fulfilled).

In addition, or alternatively to service provider cancellations, the operations computing system 102A can include and implement logic for handling user cancellations. As one example, if the user cancels the transportation request/itinerary prior to the scheduled time of pick up and/or actual pick up for the initial transportation leg, the operations computing system 102A can cancel the entire trip/itinerary. As another example, if a transportation service provider has already been matched for the initial leg, a first cancellation by the user can be treated as a request to re-match the user for the initial transportation leg. A second cancellation by the user can then result in the entire trip/itinerary being cancelled. This logic which interprets the first cancellation as a re-match request avoids cancelling the entire trip when the user is simply cancelling the match with the first service provider because the first service provider is not making substantial progress toward completing the transportation service (e.g., service provider's vehicle is not moving toward the pick up location).

According to another aspect of the present disclosure, in some implementations and scenarios, the operations computing system 102A can disable the ability of a transportation service provider to contact the user. In particular, one possible scenario is that the user is currently being transported via flight-based transportation. During flight, the user may have been matched with a ground-based transportation provider. The ground-based transportation provider may arrive at the transfer point (e.g., a destination transportation node) in advance of the user's flight and begin contacting the user (e.g., via phone call or text message) asking the user of their location and if the user is ready to engage in the ground-based transportation service. This can be a frustrating or otherwise undesirable experience for the user as the user may feel as though they are delaying the ground-based transportation service provider and/or being rushed by the ground-based transportation service provider but, because they are currently on the flight, the user is unable to take action to reduce the time until the ground-based service can be engaged. Thus, to prevent this scenario, the operations computing system 102A may disable a ground-based service provider's ability to contact the user if the ground-based service is being provided following a flight-based transportation leg and the flight-based transportation leg has not yet completed. Once the flight-based transportation leg has completed, the service provider may be re-enabled to contact the user. In some implementations, the operations computing system 102A can provide the user with status updates to keep the user informed despite disabling the service provider's ability to contact the user (e.g., "John has arrived and is ready to take you to your destination"). In some implementations, the operations computing system 102A can provide the service provider with status updates to keep the service provider informed despite disabling the service provider's ability to contact the user (e.g., "Jane's flight is delayed by 5 minutes" or "Jane's flight will arrive in 7 minutes").

In some implementations, the operations computing system 102A can perform one or more mitigation processes or routines to mitigate failure of one or legs of transportation in a multi-leg transportation itinerary. As one example, a mitigation process implemented by the operations computing system 102A can include and implement logic for responding to cancellations of flights on which a user is booked. As one example, if a planned flight is cancelled and the user has not yet initiated the itinerary or a threshold period before initiation of the itinerary has not yet been reached, then the operations computing system 102A can cancel the entire trip/itinerary. The user can be notified of the cancellation and given an opportunity to re-submit the request for transportation. However, if the user has already initiated the itinerary or a threshold period before initiation of the itinerary has been entered, the operations computing system 102A can notify the user and offer to re-route (e.g., re-plan the trip with updated information, re-match for the transportation leg with an alternative service provider, and/or change that transportation leg to an alternative transportation modality) the user. In some implementations, the re-routing operations can be given preference or preferential treatment (e.g., the user's use of a luxury modality may be subsidized or reduced fare).

In some implementations, when a multi-modal itinerary has been completed, the operations computing system 102A can provide the user with a single receipt. The single receipt can detail respective portions of the final cost associated with each of the multiple legs of transportation. The operations computing system 102A can generate the single receipt by generating multiple receipts respectively for the multiple transportation legs and then stitching the multiple receipts to generate the single receipt.

The operations computing system 102A can include a number of different systems such as a world state system 126A, a forecasting system 128A, a facilitation/planning system 130A, and a matching and fulfillment system 132A. The matching and fulfillment system 132A can include a different matching system 134A for each transportation modality and a monitoring and mitigation system 136A. Each of the systems 126A-136A can be implemented in software, firmware, and/or hardware, including, for example, as software which, when executed by the processors 112A cause the operations computing system 102A to perform desired operations. The desired operations, for example, can provide one or more backend services of the operations computing system 102A to the one or more vehicle provider computing device(s) 195A and/or other associated devices 140A, 145A, 150A, 160A, 170A, 190A, 195A. For example, the world state system 126A can provide a backend world state service. The forecasting system 128A can provide a backend forecasting service. The facilitation/planning system 130A can provide a backend routing service. The matching and fulfillment system 132A can provide a matching and monitoring service. The systems 126A-136A can cooperatively interoperate (e.g., including supplying information to each other).

The world state system 126A can operate to maintain data descriptive of a current state of the world. For example, the world state system 126A can generate, collect, and/or maintain data descriptive of predicted rider demand; predicted service provider supply; predicted weather conditions; planned itineraries; pre-determined transportation plans (e.g., flight plans) and assignments; current requests; current ground transportation service providers; current transportation node operational statuses (e.g., including re-charging or re-fueling capabilities); current aircraft statuses (e.g., including current fuel or battery level); current aircraft pilot statuses; current flight states and trajectories; current airspace information; current weather conditions; current communication system behavior/protocols; and/or the like. The world state system 126A can obtain such world state information through communication (e.g., via an API platform) with some or all of the devices 140A, 145A, 150A, 160A, 170A, 190A, 195A. For example, devices 140A, 145A can provide current information about riders/users while devices 150A, 160A, 170A, and 195A can provide current information about service providers. Devices 190A can provide current information about the status of infrastructure and associated operations/management.

The forecasting system 128A can generate predictions of the demand and supply for transportation services at or between various locations over time. The forecasting system 128A can also generate or supply weather forecasts. The forecasts made by the system 128A can be generated based on historical data and/or through modeling of supply and demand. In some instances, the forecasting system 128A can be referred to as an RMR system, where RMR refers to "routing, matching, and recharging." The RMR system can be able to simulate the behavior of a full day of activity across multiple ride share networks.

The facilitation/planning system 130A can generate transportation plans for various transportation assets and/or can generate itineraries for riders/users. For example, the facilitation/planning system 130A can perform flight planning. As another example, facilitation/planning system 130A can plan or manage/facilitate itineraries which include interactions between users and service providers across multiple modes of transportation.

The matching and fulfillment system 132A can match a user with a service provider for each of the different transportation modalities. For example, each respective matching system 134A can communicate with the corresponding service provider computing devices 150A, 160A, 170A via one or more APIs or connections. Each matching system 134A can communicate trajectories and/or assignments to the corresponding service providers. Thus, the matching and fulfillment system 132A can perform or handle assignment of ground transportation, flight trajectories, take-off/landing, etc.

The monitoring and mitigation system 136A can perform monitoring of user itineraries and can perform mitigation when an itinerary is subject to significant delay (e.g., one of the legs fails to succeed). Thus, the monitoring and mitigation system 136A can perform situation awareness, advisories, adjustments and the like. The monitoring and mitigation system 136A can trigger alerts and actions sent to the devices 140A, 145A, 150A, 160A, 170A, 190A, and 195A. For example, riders/users, service providers, and/or operations personnel can be alerted when a certain transportation plan has been modified and can be provided with an updated plan/course of action. Thus, the monitoring and mitigation system 136A can have additional control over the movement of aircraft, ground vehicles, pilots, and riders/users.

As one example, the operations computing system 102A (e.g., facilitation/planning system 130A) can receive multi-modal transportation data indicative of one or more requests for a plurality of transportation services and generate the plurality of multi-modal transportation itineraries for facilitating the plurality of transportation services. An aerial vehicle can be assigned (e.g., by the operations computing system 102A, the vehicle provider computing device(s) 195A, etc.) to provide at least one leg of the multi-modal transportation itinerary. For example, the multi-modal transportation itinerary can include at least one aerial transportation leg. The aerial vehicle can be assigned to provide the at least one aerial transportation leg. The operations computing system 102A (e.g., matching and fulfillment system 132A) and/or the vehicle provider computing device(s) 195A (as further described herein) can schedule, track the progress of, and/or modify each of the plurality of multi-modal transportation itineraries and/or one or more transportations legs (e.g., the at least one aerial transportation leg) thereof during operational time period. A modification, for example, can include a modification to a flight schedule generated and maintained by the operations computing system 102A and/or a modification to a flight schedule generated and maintained by the vehicle provider computing device(s) 195A. For example, the operations computing system 102A can generate a new multi-modal transportation itinerary, modify at least one of the plurality of multi-modal transportation itineraries, request the modification of at least one of the plurality of multi-modal transportation itineraries, and/or receive the modification of at least one of the plurality of multi-modal transportation itineraries based on the progress of each of the multi-modal transportation itineraries and/or additional multi-modal transportation data (e.g., indicative of one or more additional requests, etc.).

In some implementations, the operations computing system 102A can also store or include one or more machine-learned models. For example, the models can be or can otherwise include various machine-learned models such as support vector machines, neural networks (e.g., deep neural networks), decision-tree based models (e.g., random forests), or other multi-layer non-linear models. Example neural networks include feed-forward neural networks, recurrent neural networks (e.g., long short-term memory recurrent neural networks), convolutional neural networks, or other forms of neural networks.

In some instances, the service provider computing devices 150A, 160A, 170A can be associated with autonomous vehicles. Thus, the service provider computing devices 150A, 160A, 170A can provide communication between the operations computing system 102A and an autonomy stack of the autonomous vehicle which autonomously controls motion of the autonomous vehicle.

The infrastructure computing devices 190A can be any form of computing device used by or at the infrastructure or operations personnel including, for example, devices configured to perform passenger security checks, luggage check in/out, re-charging/re-fueling, safety briefings, vehicle check in/out, and/or the like.

In some implementations, the computing system 100A can include one or more vehicle provider computing devices 195A. The vehicle provider computing device(s) 195A can be associated with one or more vehicle providers. A vehicle provider can be an entity (e.g., a first party entity, third party entity, etc.) that operates, owns, leases, controls, manufactures, etc. one or more vehicles. For example, a vehicle provider can include an operator, vendor, supplier, manufacturer, etc. of one or more aircraft. Each vehicle provider can be associated with respective vehicle provider computing device(s) 195A. The vehicle provider computing device(s) 195A can be configured to manage the vehicles associated with that vehicle provider. This can include, for example, overseeing itineraries, accepting/rejecting transportation services, suggesting candidate vehicles, overseeing maintenance, controlling online/offline status, etc. A vehicle provider computing device 195A can communicate with the operations computing system 102A directly and/or indirectly. A vehicle associated with a vehicle provider can communicate directly with the operations computing system 102A and/or indirectly via the vehicle provider computing device(s) 195A (e.g., acting as an intermediary, etc.).

The vehicle providers' vehicles that are available for transportation services can include one or more types of vehicles. For example, the vehicle provider(s) can include a plurality of aerial vehicle providers, where each vehicle provider can provide a different type of aircraft (e.g., VTOL, helicopter, etc.) and/or a different model of aircraft. In some implementations, a vehicle provider can provide more than one type, version, model, etc. of aircraft available for the operations computing system 102A and/or the service entity. The different types of aircraft can include different shapes, sizes, capacities, capabilities, parameters, autonomy abilities (e.g., autonomous, semi-autonomous, manual, etc.), landing gear, hardware, etc. Although the following describes vehicle providers as aerial vehicle providers, this is provided as an example only and is not intended to be limiting. For example, vehicle providers can include providers of other types of vehicles such as ground-based vehicles (e.g., cars, bicycles, scooters, etc.) and/or other modes of transportation.

The operations computing system 102A and the vehicle provider computing device(s) 195A can communicate information to one another. The vehicle provider computing device(s) 195A can communicate various types of information to the operations computing system 102A. For example, the vehicle provider computing device(s) 195A can provide data indicative of: status information (e.g., online/offline status, on-trip status, vehicle availability for transportation service, etc.), acceptance and/or rejection of a service (e.g., an aerial transportation service, etc.), maintenance information, vehicle parameters (e.g., weight capacity, space capacity, noise signature, number of seats, set configuration, flight hours, charging/refueling parameters, hardware, temperature control parameters, operational restrictions, etc.), flight schedules, candidate vehicles, locations, updates of any such information, etc. The operations computing system 102A can communicate various types of information to a vehicle provider device 195A. For example, the operations computing system can provide data indicative of: transportation services (e.g., services needed, specific vehicle requests, etc.), vehicle itineraries, status information (e.g., service in progress, etc.), vehicle parameter updates, payloads, locations, user/passenger information (e.g., anonymized and securely protected, etc.), air traffic information, environmental data (e.g., expected wind speeds, weather information, etc.), and/or other types of information.

The service entity associated with the operations computing system 102A can utilize vehicles associated with various parties. In some implementations, the service entity can also be a vehicle provider (e.g., a first party entity, etc.). For example, the service entity can utilize vehicles (e.g., ground-based vehicles, aircraft, etc.) within the service entity's fleet that are online with the transportation platform, etc. Additionally, or alternatively, the service entity can utilize vehicles provided by a vehicle provider from the vehicle provider's fleet. A fleet can include one or a plurality of vehicles. A vehicle provider can make one or more of the vehicles in its fleet available to the service entity/operations computing system 102A. For example, the vehicle provider computing device(s) 195A and/or a service provider computing device of a vehicle can log into a transportation platform, provide data indicating a vehicle is available, facilitate the vehicle being actively engaged with the transportation platform, and/or otherwise inform a service entity of a vehicle's availability. In some implementations, a vehicle provider computing device 195A can provide data indicative of vehicles that are not online with the service entity and that could or may become available.

The vehicles to be utilized for a particular multiple-modal transportation service can be determined in a variety of manners. The operations computing system 102A (and the associated service entity) may have varying levels of control over the vehicle(s) that perform its services. For example, a vehicle provider may make one or more vehicles available to the service entity. The service entity may be able to determine which vehicles are to perform which legs of a transportation without input from the vehicle provider. Thus, the service entity may have full control of the vehicles online with the platform.

In some implementations, the service entity may determine transportation service assignments for vehicles of the service entity, while a vehicle provider may be able to determine (e.g., accept, reject, etc.) transportation service assignments for its vehicles. For example, the operations computing system 102A can provide data indicative of a flight leg, itinerary, etc. to one or more vehicle provider computing devices 195A. The data can indicate a request for a specific vehicle or a request for any available vehicle within the vehicle provider's available fleet to perform the transportation service (e.g., flight transportation between two vertiports, etc.). In some implementations, the data may include certain parameters (e.g., weight capacity, space capacity, number of seats, noise parameters, etc.) needed and/or preferred by the service entity, user, etc. The vehicle provider computing device 195A can process this data and determine whether a specifically requested vehicle and/or another vehicle associated with the vehicle provider will provide the requested service (e.g., perform a flight for the second leg of a multi-model transportation service). The vehicle provider computing device 195A can communicate data indicative of the acceptance or rejection to the operations computing system 102A. In some implementations, data indicative of the requested transportation service can be communicated to a service provider computing device 150A, 160A, 160A associated with a vehicle of a vehicle provider's fleet (e.g., an aircraft, etc.) and the service provider can accept or reject the service (e.g., the flight transportation, etc.).

In some implementations, one or more vehicle provider computing device(s) 195A can communicate data indicative of a plurality of candidate vehicles that could provide the requested service (e.g., perform an aerial transportation service for a flight leg). The operations computing system 102A can select from among the plurality of candidate vehicles and communicate data indicative of the selected candidate vehicle to the vehicle provider computing device(s) 195A.

In another example, the service entity associated with the operations computing system 102A can be a vehicle provider (e.g., aerial vehicle provider) and can coordinate additional legs of a multi-modal transportation itinerary with one or more other vehicle providers (e.g., ground vehicle providers). By way of example, the operations computing system 102A can receive a service request for transportation. The service entity associated with the operations computing system 102A can be an aerial vehicle provider and the request can be generated via a software application associated with the aerial vehicle provider. The operations computing system 102A can communicate with one or more vehicle provider computing devices 195A of one or more ground-based vehicle providers to determine whether any (and which) ground-based vehicle(s) may be available to create a multi-modal itinerary including an aerial flight leg. This can include determining ground-based vehicle(s) that may be available for a first leg (before the aerial leg) or a third leg (after the aerial leg) of a three leg itinerary. This can allow the operations computing system 102A (e.g., associated with the aerial vehicle provider) to generate and/or otherwise coordinate a multi-modal itinerary, including aerial transport, for a user The operations computing system 102A can determine which vehicles are to perform which transportations legs in an on-demand manner or based at least in part on a schedule. For example, operations computing system 102A can initially generate a flight itinerary in response to receiving a first request. In some implementations, the operations computing system 102A can have a pre-determined flight schedule and offer aerial transport (e.g., for multi-modal transportation services, etc.) in the event that a user's time constraints and locations can be met with the pre-determined flight schedule.

In some implementations, the vehicle provider may provide initial input regarding vehicle scheduling. For example, the vehicle provider computing device 195A can communicate data indicative of a flight schedule for one or more aircrafts between various vertiports. The vehicle provider 195A can communicate initial seat availability, as well as updates throughout an operational time period (e.g., throughout a day, etc.), to the operations computing system 102A. The operations computing system 102A can utilize this flight schedule to determine itineraries for users and/or vehicles of the transportation service. For example, the operations computing system 102A can use the flight schedule to determine whether to offer a multi-modal transportation service with an aerial leg to a user and/or to generate itineraries with aerial legs based on the flight schedule. In some implementations, the flight schedule can be an initial flight schedule for an operational time period. For example, the vehicle provider computing device(s) 195A can provide data indicative of the initial flights for the available vehicles at the beginning of a day. The operations computing system 102A can utilize this data to determine multi-modal transportation services at the beginning of the day. Thereafter, the operations computing system 102A can determine the flight itineraries in an on-demand manner to meet user/passenger demand throughout the operational time period.

Additionally, or alternatively, the operations computing system 102A can communicate data indicative of a schedule (e.g., initial, for full operational period, etc.) to the vehicle provider computing device(s) 195A. The vehicle provider computing device(s) 195A can process the schedule and communicate data indicative of which vehicles (e.g., aircraft, etc.) are available for which services (e.g., flight legs, etc.).

In some implementations, the operations computing system 102A can communicate data indicative of a transportation service (e.g., one or more flight legs, schedules, etc.) to a plurality of vehicle provider computing device(s) 195A. One or more of the vehicle provider computing device(s) 195A can process the data and communicate data indicative of vehicle(s) (e.g., aircraft, etc.) that are available to fulfill the transportation service (e.g., perform aerial transportation for one or more leg(s), etc.) to the operations computing system 102A. In some implementations, the vehicle provider computing device(s) 195A can provide information indicative of vehicle parameters, costs/fees, etc. The operations computing system 102A can be configured to analyze the responses from the plurality of vehicle provider computing devices 195A to determine a service provider. For example, the operations computing system 102A can utilize rules, models, algorithms, etc. that weigh the various vehicle parameters to select an aircraft for a user to ensure that the user's estimated arrival times are not violated, to minimize costs, etc.

The vehicle provider computing device(s) 195A and/or the operations computing system 102A can communicate data indicative of the transportation service (e.g., flight itinerary data, etc.) to a service provider computing device 150A, 160A, 170A, 195A associated with a vehicle. For example, a vehicle provider device 195A or the operations computing system 102A can communicate data indicative of a flight (e.g., times, locations, users, payload, etc.) to a computing device onboard an aircraft and/or a device of a pilot of the aircraft.

The network(s) 180A can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180A can be accomplished, for instance, via a network interface using any type of protocol, protection scheme, encoding, format, packaging, etc.

Figure 1B:
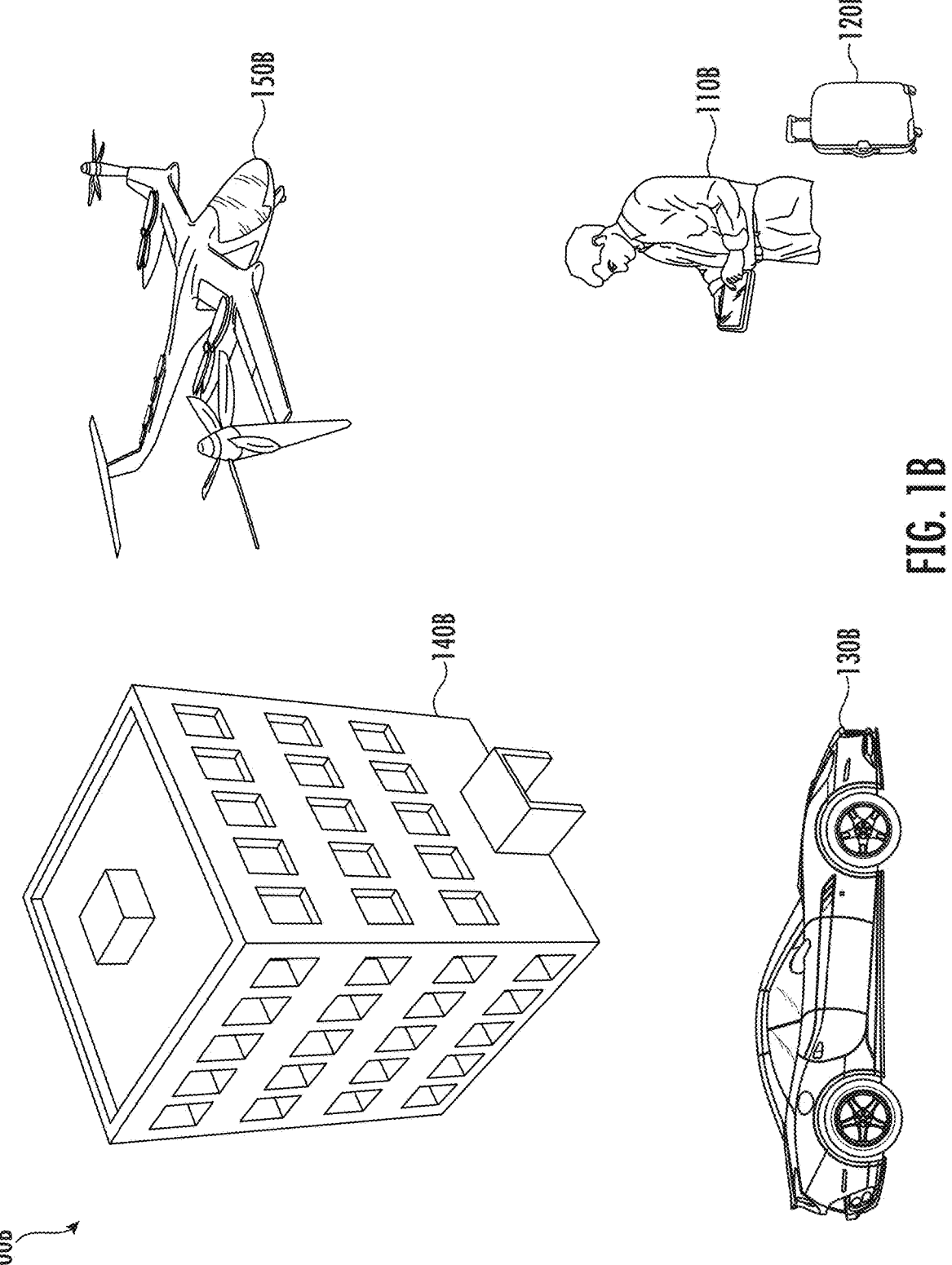
FIG. 1B illustrates an example multimodal transportation system in which an individual and a payload item associated with the individual may be routed from an origin to a destination using different vehicles according to an example.

FIG. 1B illustrates an example multimodal transportation system 100B in which an individual 110B and a payload item 120B associated with the individual 110B may be routed from an origin to a destination using different vehicles according to an example. The multimodal transportation system 100B is illustrated as comprising an individual 110B, a payload item 120B, a vertiport 140B, an aerial vehicle 150B, and a ground vehicle 130B. The aerial vehicle 150B may be a vertical take-off and landing (VTOL) aircraft. The ground vehicle 130B may be a car, a truck, a bus, a train or any other type of ground transportation.

In the example, an aerial vehicle 150B travels between vertiports 140B. As used herein, a vertiport 140B is a location at which an aerial vehicle 150B arrives, departs, refuels/recharges, and/or is maintained, among other examples. A vertiport 140B may have the capability to determine payload information associated with a payload item 120B when the individual 110B arrives at the vertiport 140B. The vertiport 140B may be associated with a vertiport data store that includes historical demand information/historical payload information and the like. The historical demand information may be used to forecast current and/or future demand at a given vertiport, as well as between pairs of vertiports. Using this information, anticipated or predicted payload information may be determined. The anticipated number of payload items may be adjusted in real-time or substantially real-time as various individuals 110B confirm reservations, modify existing reservations, and/or arrive at the vertiport 140B.

A payload item 120B transported by an aerial vehicle 150B may comprise baggage, cargo, or any item associated with an individual 110B that the individual wishes to transport from an origin to a destination. In an example, the payload item 120B is stored within a cabin of the aerial vehicle 150B, within a storage compartment of the aerial vehicle 150B or within a cargo hold of the aerial vehicle 150B.

A payload item 120B may have a payload characteristic. A payload characteristic may include a payload weight, payload size, payload shape, payload type, and/or a payload volume. Payload information associated with an individual can be indicative of one or more payload characteristics of a payload item 120B. A payload item 120B may also be associated with a pick up location, a drop off location, and/or a distance the payload item 120B has to travel between an origin, a pick up location, a drop off location, and/or destination. The individual may submit (e.g., via a software application on a computing device) a payload pick up request and/or a payload item drop of request with such information.

The multimodal transportation system 100B may also provide or otherwise be associated with an application programming interface (API). The API is used to enable the individual 110B to register with the multimodal transportation system 100B. The API may also be used to indicate that a particular aerial vehicle 150B is active. The API may also be used to determine or receive payload capacity information for the aerial vehicle 150B.

The API may also be used by a ground vehicle 130B to register with the multimodal transportation system 100B. For example, a ground vehicle 130B (e.g., via a computing device associated with a driver of the ground vehicle 130B and/or with the ground vehicle 130B) may communicate with a server or other computing device associated with the multimodal transportation system 100B via the API to indicate that the ground vehicle 130B is available to pick up and individual, pick up one or more payload items associated with an individual or various individuals, transport the individual to a vertiport, and/or transport one or more payload items 120B to a particular destination or drop off point. In one example, a ground vehicle 130B may be selected to transport of the payload item 120B based, at least in part, on an anticipated or determined destination of the ground vehicle 130B. In another example, the ground vehicle 130B is identified based on an amount of cargo space (e.g., trunk size) of the ground vehicle 130B. In another example, the ground vehicle 130B is selected based on received input from a driver of the ground vehicle 130B (e.g., the driver indicates that she is available and/or willing to transport one or more payload items 120B to a drop off point or other destination).

A payload item 120B may be routed from an origin to a destination at various points along the route from the origin to the destination. In some examples, the payload item 120B is routed in a ground vehicle 130B when the payload item 120B arrives at the vertiport 140B at which aerial vehicle 150B is located. In another example, a ground vehicle 130B may arrive at a home of an individual 110B and transport the individual 110B and the payload item 120B to the vertiport 140B. At that point, the individual may travel to a destination vertiport via the aerial vehicle 150B while the payload item 120B is routed to the destination vertiport via the ground vehicle 130B, a different ground vehicle, a series of ground vehicles or a series of ground vehicles and aerial vehicles. In other examples, the destination vertiport may not be the destination location for the payload item 120B. For example, the desired destination location for the payload item is the home of the individual 110B, a hotel that the individual 110B is staying in and the like. In such an example, the ground vehicle 130B transports the payload item to a destination selected or otherwise provided by the individual. The destination for the payload item 120B can be indicated via a user interface of a user device associated with the individual 110B. In some implementations, a computing system can provide data/instructions for a user interface can prompt the user to enter a destination for the payload item after a computing system determines that the payload item would exceed a weight capacity of an aerial vehicle 150B (e.g., VTOL aircraft) assigned to the individual 110B. In some implementations, the individual 110B can enter such information when making a request for a transportation service and/or otherwise before a computing system determines that the payload item would exceed a weight capacity of an aerial vehicle 150B (e.g., VTOL aircraft) assigned to the individual 110B.

While the multimodal transportation system 100B is described with respect to a single aerial vehicle 150B traveling from a starting vertiport 140B to a destination vertiport and a single ground vehicle 130B is used to transport a payload item 120B, it will be appreciated that, in other examples, additional vertiports 140B, aerial vehicles 150B and/or ground vehicles 130B are used to transport individuals 110B and payload items 120B from various origins to various destinations.

For example, an intermediate vertiport may be used to refuel/recharge an aerial vehicle 150B and/or transport/transfer payload items 120B. For example, payload item 120B may leave aerial vehicle 150B and be loaded on another aerial vehicle and/or a ground vehicle 130B to continue on to the destination location. As another example, payload item 120B may leave aerial vehicle 150B at a first intermediate vertiport, travel to a second intermediate vertiport using a ground vehicle 130B, and be loaded on another aerial vehicle 150B at the second intermediate vertiport to continue on to the destination location. Thus, a payload item 120B need not only travel within the multimodal transportation system 100B from a starting vertiport to a destination vertiport and may instead by routed from a starting location to a destination location using any of a variety of transportation modes, intermediate stops, and vehicles.

In an example, an individual 110B uses a computing device to access an application provided by one or more ridesharing service providers and specify a starting location and a destination location. As illustrated, individual 110B may use a tablet computing device to access the application but any of a variety of other computing devices may be used. Depending on the location and/or input provided by the individual 110B, a ground vehicle 130B may be assigned to transport the individual 110B and a payload item 120B associated with the individual from the starting location to a vertiport 140B. In some examples, the individual 110B travels to the vertiport 140B using a first ground vehicle 130B while the payload item 120B may be transported to the vertiport 140B, to a destination, or a second vertiport using a different ground vehicle 130B.

Vertiport 140B is a location at which aerial vehicles (e.g., aerial vehicle 150B) arrive, depart, refuel/recharge, and/or are maintained, among other examples. Thus, vertiport 140B may have any of a variety of associated capabilities, including, but not limited to, the ability to charge and/or refuel aerial vehicle 150B and the ability to perform different types of vehicle maintenance. Vertiport 140B may be located at ground level, above ground level, or below ground level. It will be appreciated that while multimodal transportation system 100B is illustrated as comprising one aerial vehicle 150B, any number of aerial vehicles may use capabilities associated with vertiport 140B. Returning to the above example, individual 110B and/or payload item 120B may start at vertiport 140B or may arrive at vertiport 140B for transportation via aerial vehicle 150B (e.g., after transportation by another aerial vehicle, via ground vehicle 130B).

Figure 1C:
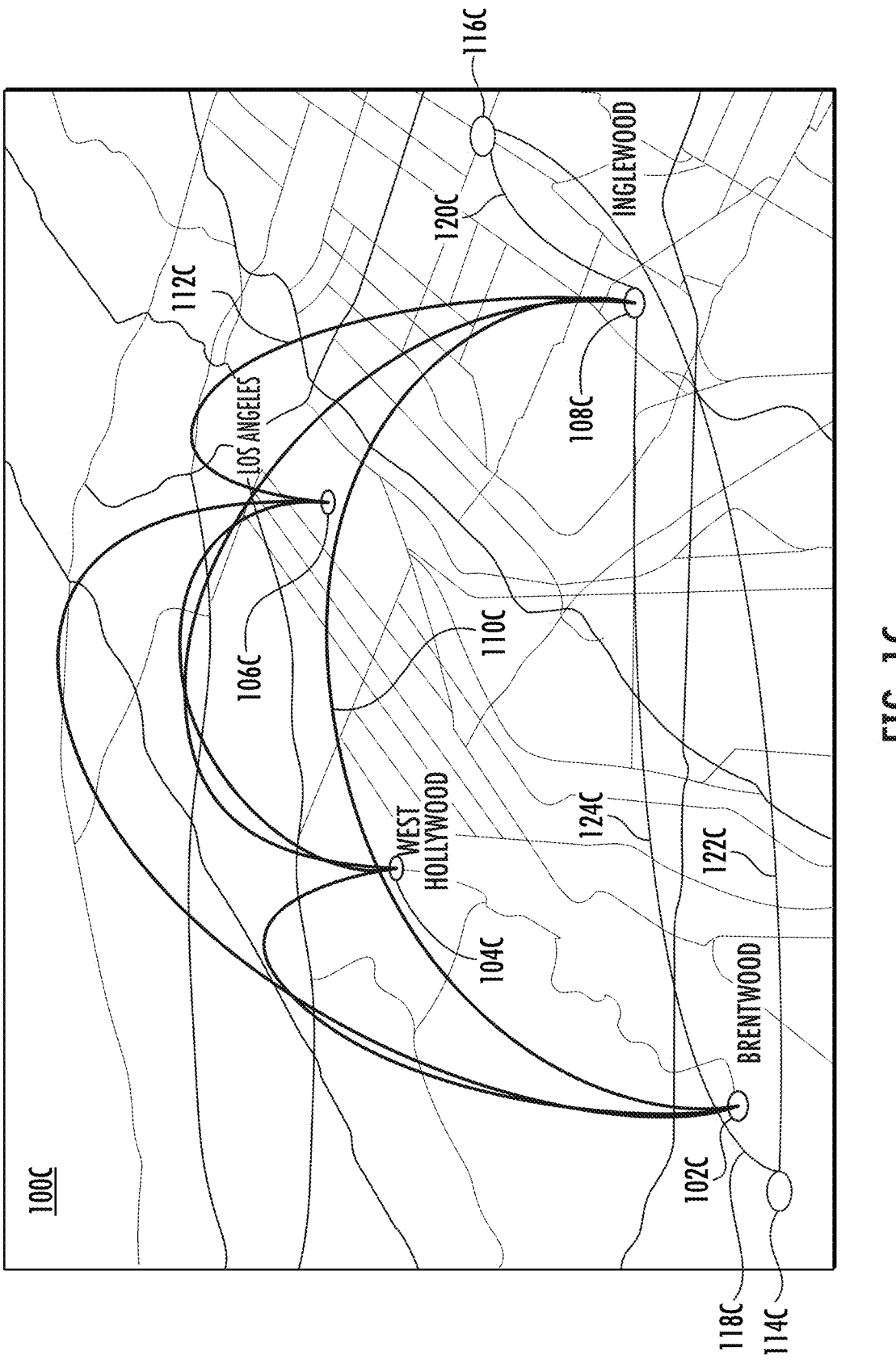
FIG. 1C depicts a graphical diagram of an example multi-modal transportation service itinerary according to example embodiments of the present disclosure.

As an example, FIG. 1C depicts a graphical diagram of an example set of flight plans between an example set of transportation nodes according to example embodiments of the present disclosure. In particular, FIG. 1C provides a simplified illustration of an example fixed infrastructure associated with flight-based transportation in an example metropolitan area. As illustrated in FIG. 1C, there can be four transportation nodes which may be referred to as "aerial transportation facilities." For example, a first transport node 102C is located in a first neighborhood of the metropolitan area, a second transportation node 104C is located in a second neighborhood, a third transportation node 106C is located in a third neighborhood, and a fourth transportation node 108C is located in a fourth neighborhood. The location and number of transportation nodes is provided only as an example. Any number of transportation nodes at any different locations can be used.

Flights can be available (e.g., may be pre-planned, dynamically planned, etc.) between certain pairs of the transportation nodes. For example, aerial transportation leg 110C can exist between the first transport node 102C and the fourth transportation node 108C. Likewise, a flight path 112C can exist between the fourth transportation node 108C and the third transportation node 106C.

As another example, FIG. 1C depicts a graphical diagram of an example multi-modal transportation service itinerary 100C according to example embodiments of the present disclosure. The multi-modal transportation itinerary 100C can include three transportation legs to transport the rider from an origin 114C to a destination 116C. In particular, the multi-modal transportation itinerary 100C can include a first, ground-based (e.g., car-based) transportation leg 118C which transports the rider from the origin 114C to a first transport node 102C; a second, aerial transportation leg 110C which transports the rider from the first transport node 102C to an fourth transportation node 108C; and a third, ground-based (e.g., car-based) transportation leg 120C which transports the rider from the fourth transportation node 108C to the destination 116C. More particularly, the multi-modal transportation itinerary 100C can include a first ground transportation leg 118C from the origin 114C to a first transport node 102C, an aerial transportation leg 110C from the first transport node 102C to a fourth transportation node 108C, and a second ground transportation leg 120C from the fourth transportation node 108C to the destination 116C. The aerial transportation leg 110C can include a selected plan (e.g., flight itinerary) of one or more candidate flight itineraries obtained from the vehicle provider computing system.

The multi-modal transportation itinerary 100C can include an alternate payload itinerary wherein the alternate payload itinerary can include determining an itinerary bypassing aerial transportation. For example, the alternate payload itinerary can involve the payload being transported by transportation leg 122C from the origin 114C directly to the destination 116C (e.g., by alternative transportation options such as a ground-based (e.g., car-based) transportation). As another example, the alternative payload itinerary can involve the payload being transported by transportation leg 124C from the origin 114C directly to the fourth transportation node 108C (e.g., by alternative transportation options such as a ground-based (e.g., car-based) transportation). Although not shown, the alternative payload itinerary can involve a multitude of other potential diverging paths including the payload being transported to a destination different from the passenger (e.g., the payload can be delivered to a hotel while the passenger goes to an office building). Another exemplary payload itinerary could involve the payload traveling from the first transport node 102C to the destination 116C. Although the payload itineraries may result in the payload item arriving at a destination at a time after the individual, this may be preferred because it may allow the individual to arrive at the destination quicker than if the individual was forced to travel via a different, slower itinerary (e.g., without an aerial leg).

Turning back to FIG. 1, operations computing system 102A can identify a set of candidate transportation plans that can form the basis for building a set of potential itineraries. As described in further detail herein, the set of candidate transportation plans can include each possible transportation itinerary between each node of the fixed transportation infrastructure at a respective time. The operations computing system 102A can stitch additional transportation legs to each respective candidate transportation plan to generate a plurality of candidate end-to-end itineraries. The operations computing system 102A can analyze the candidate itineraries to select one or more itineraries that are high quality according to various measures. The operations computing system 102A can interact with one or more vehicle provider computing device(s) 195A and/or service provider computing device 150A, 160A, 170A to facilitate at least one of the one or more multi-modal transportation itineraries. In some implementations, the operations computing system 102A can perform similar such operation(s) to generate payload itineraries for transferring payload items.

In some implementations, to help facilitate multi-modal transportation services provided throughout an operational time period, the operations computing system 102A can generate and initiate a number of simulation instances for each time step of an operational time period. The operational time period, for example, can include any unit of time during which transportation services and/or servicing services can be provided. By way of example, the operational time period can include one or more hours, days, weeks, etc. of operations. The simulation instances can be utilized by the operations computing system 102A and/or provided to the vehicle provider computing device(s) 195A to facilitate the scheduling, fulfillment, and modification of transportation services during the operational time period. The simulation instances can include simulation the need to coordinate payload itineraries and/or capacity overages and the effect on the transportation operations for that given operational time period.

Figure 2A:
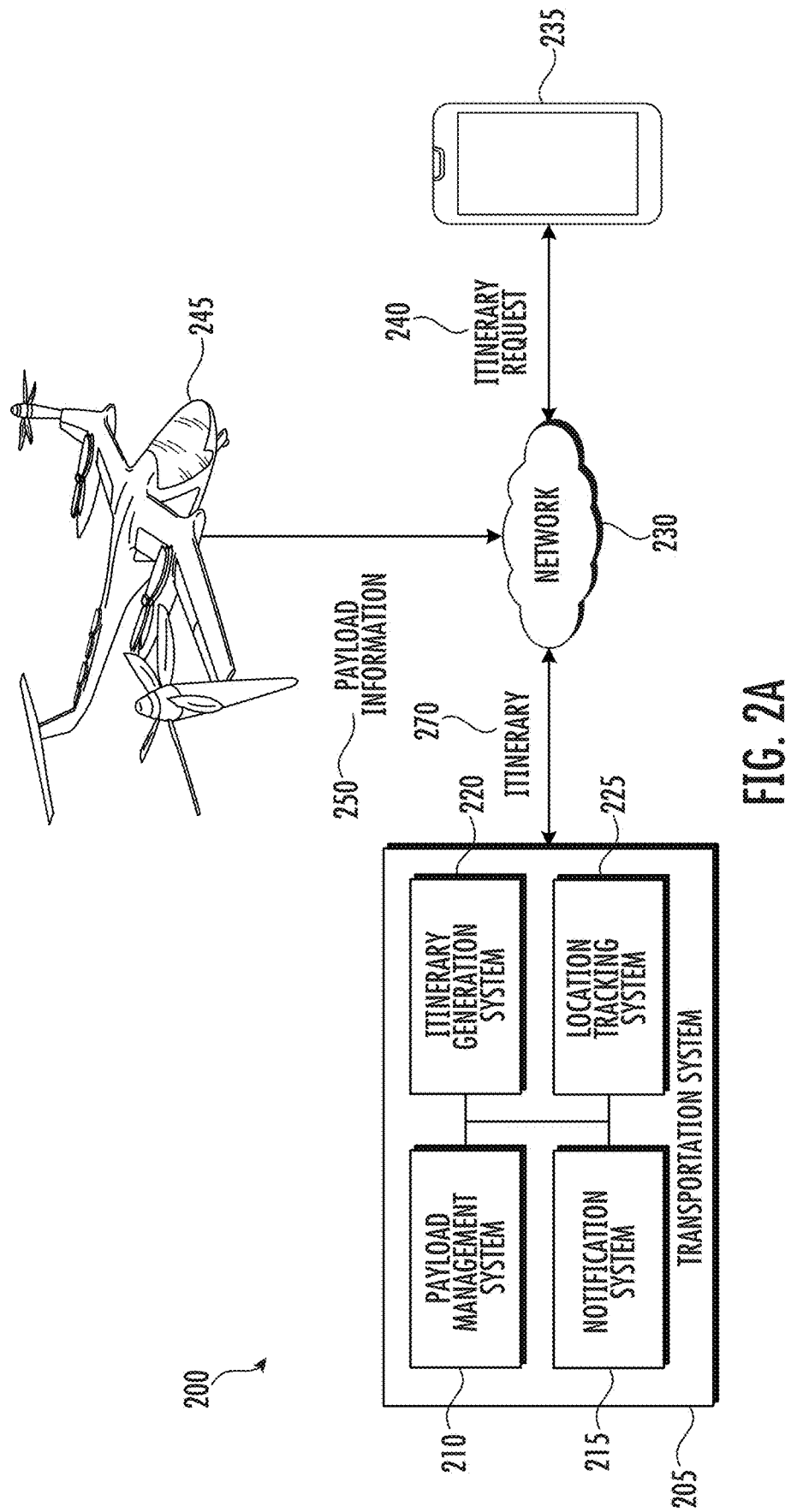
FIG. 2A illustrates an example transportation system for routing payload items for a vertical take-off and landing aircraft using a ground vehicle according to an example.

FIG. 2A illustrates an example system 200 for routing payload items (e.g., payload item 120 (FIG. 1)) using a ground vehicle (e.g., ground vehicle 130 (FIG. 1)) according to an example. The payload item is routed from an origin to a destination using a ground vehicle due to one or more payload constraints associated with a VTOL aircraft 245. The payload constraint may be associated with weight criteria of the VTOL aircraft 245. The weight criteria may indicate a maximum amount of weight (including passengers and payload items) that can be loaded on the VTOL aircraft 245 while still allowing the VTOL aircraft 245 to takeoff, fly, and land safely.

The payload constraint may also be associated with a payload capacity of the VTOL aircraft 245. The payload capacity of the VTOL aircraft 245 may be the total volume of payload items that may be placed in a storage compartment and/or cargo hold of the VTOL aircraft 245.

The system 200 may be incorporated by or otherwise associated with the multimodal transportation system 100C shown and described with respect to FIG. 1C (and/or operations computing system 102A of FIG. 1A). The system 200 may include a computing system 205 (e.g., a transportation system associated with a transportation service provider, aerial vehicle provider, etc.). The computing system 205 may determine whether to route payload items associated with an individual from an origin to a destination on a VTOL aircraft 245 or via an alternative transportation method such as, for example a ground vehicle. The computing system 205 may include a payload management system 210, a notification system 215, an itinerary generation system 220 and a location tracking system 225. Each of these various systems may communicate with each other and share determined and/or received information to ensure the weight criteria of the VTOL aircraft 245 and/or a payload capacity of the VTOL aircraft 245 is adhered to.

In an example, a determination of whether to route one or more payload items associated with the individual from an origin to a destination is made when the individual is selecting or otherwise reserving an itinerary. For example, the individual accesses or otherwise uses a computing device 235 and submits, over a network 230, data indicative of the potential itinerary request 240 to the computing system 205.

The data indicative of the potential itinerary request 240 includes information about the individual. The information may include log-in information, profile information, a desired origin, a desired destination, a desired departure time, a desired arrival time, a number of payload items, an estimated or determined weight of each payload item, a number of individuals travelling with the individual, and/or an estimated or determined volume of each payload item. The information about the individual can be securely stored (e.g., encrypted) such that the information about the individual is inaccessible except by systems expressly allowed by the individual.

In an example, the desired origin is a particular vertiport from which the individual wishes to depart. In another example, the desired origin is a location other than the vertiport. For example, the data indicative of the potential itinerary request 240 includes a request that a ground vehicle associated with a ridesharing service provider pick up the individual and her payload item(s) at her home or office. The ridesharing service may then transport the individual and her payload item(s) to the vertiport.

In an example, the desired destination is a particular vertiport. In another example, the desired destination is a location other than the destination vertiport such as, for example, a hotel, an office building, a home or other location. In the latter example, the data indicative of the potential itinerary request 240 includes a request that the ground vehicle associated with the ridesharing service provider pick up the individual and/or her payload item(s) at the destination vertiport and transport the individual and her payload item(s) to the desired destination.

The data indicative of the potential itinerary request 240 may also include information about a number of payload items the individual is planning on bringing, an estimated or determined weight of each payload item, and/or an estimated or determined volume of each payload item. In an example, some of this information may have been previously received and/or stored by the computing system 205. For example, the individual associated with the data indicative of the potential itinerary request 240 may have provided some of this information as part of a previously submitted data indicative of the potential itinerary request 240. For example, if the individual previously traveled from Origin A to Destination B and is booking another trip from Origin A to Destination B, the transportation system 205 determines that the individual may have the same or similar payload item(s) for the current itinerary as she did in the previous itinerary.

In another example, the computing system 205 requests payload item information from the individual. For example, in response to receiving the data indicative of the potential itinerary request 240, the computing system 205 requests that the individual provide the number of payload items the individual is bringing, an estimated or actual weight of each payload item and/or the estimated or actual dimensions of each payload item.

In an example, the dimensions and/or an estimated weight of a payload item is obtained by an application executing on the computing device 235 using, for example a camera or other image sensor. For example, when the individual is providing various types of information as part of the data indicative of the potential itinerary request 240, the individual is prompted, via a user interface provided on the computing device 235, to provide an estimated weight and/or estimated dimensions of one or more payload items. In order to assist the individual, the user interface may activate or otherwise use a camera or other image sensor to capture various images of the payload item(s). The payload management system 210 analyzes the images and estimates the dimensions and/or weight of each payload item. In another example, the computing device 235 is configured to estimate the dimensions and/or the weight of the payload item(s).

Although the examples above provide scenarios in which weight and/or dimensions of payload item(s) are received via the data indicative of the potential itinerary request 240, the weight and/or dimensions of the payload item(s) may be received by the payload management system 210 in other ways. For example, the weight and/or dimensions of the payload item(s) may be determined when the individual arrives at the vertiport from which she will depart. In another example, a driver of a vehicle associated with a ridesharing service may provide the weight and/or dimensions of each payload item to the payload management system 210 (e.g., via a computing device associated with the driver and/or the vehicle) when the driver transports the individual from an origin to the vertiport.

When the data indicative of the potential itinerary request 240 is received, the itinerary generation system 220 determines one or more itineraries 270 that match travel parameters specified in the data indicative of the potential itinerary request 240. The travel parameters include a specified or desired departure time, a specified or desired arrival time, a specified or desired departure location and/or a specified or desired arrival location.

As itineraries 270 are being generated, the computing system 205 determines which VTOL aircraft 245 match some or all of the specified travel parameters provided by the individual. Once these VTOL aircraft 245 are identified, the payload management system 210 may request or otherwise access payload information 250 associated with each of the identified VTOL aircraft 245. The VTOL aircraft 245 may provide the payload information 250 to the payload management system 210 over the network 230. Alternatively, an associated remote computing system (e.g., an aerial vehicle provider system managing such aircraft) may provide the payload information 250 to the payload management system 210 over the network 230. The remote computing system can store information regarding and/or monitor the payload capacity of the aerial vehicle. The payload information 250 associated with an aircraft (e.g., VTOL aircraft) may include payload constraints of the VTOL aircraft 245 including the weight criteria of the VTOL aircraft 245, volume/space capacity of the VTOL aircraft 245, shape of a storage area of a VTOL aircraft 245, and/or the payload capacity of the VTOL aircraft 245.

When one or more itineraries 270 are generated, the notification system 215 provides the itineraries 270 to the computing device 235 associated with the individual. In an example, the one or more itineraries 270 are ordered, based at least in part, on payload information 250 associated with each identified VTOL aircraft 245 and on the information of the payload item(s) associated with the individual. For example, a VTOL aircraft 245 that departs from a vertiport at 1:00 PM may only have weight and/or storage capacity for one of the individual's payload items. However, a VTOL aircraft 245 that departs from the vertiport at 7:00 PM may have weight and payload storage capacity (e.g., payload storage area size, shape, temperature, etc.) for all three of the individual's payload items. As such, the itinerary 270 with the departure time of 7:00 PM may be provided to the computing device 235 associated with the individual as a first option and the itinerary 270 with the departure time of 1:00 PM may be provided to the computing device 235 associated with the individual as a second option.

In another example, the individual is provided an option to pay additional fees for payload items that exceed a weight threshold and/or a dimension threshold. In another example, the individuals that reserved flights on particular VTOL aircraft is given payload item preference (e.g., they may be allowed to bring additional payload items) over individuals that reserved flights closer to the departure time. In another example, individuals that reach a particular status (e.g., a frequent flyer or user of one or more ridesharing service providers) have payload item preference when compared to individuals that do not have the particular status. In another example, a computing system can identify an alternate itinerary for the individual. The alternate itinerary can identify an alternate VTOL aircraft that has capacity for the payload item. The computing system can provide, for display on the computing device of the individual, data indicative of the alternate itinerary.

Figure 2B:
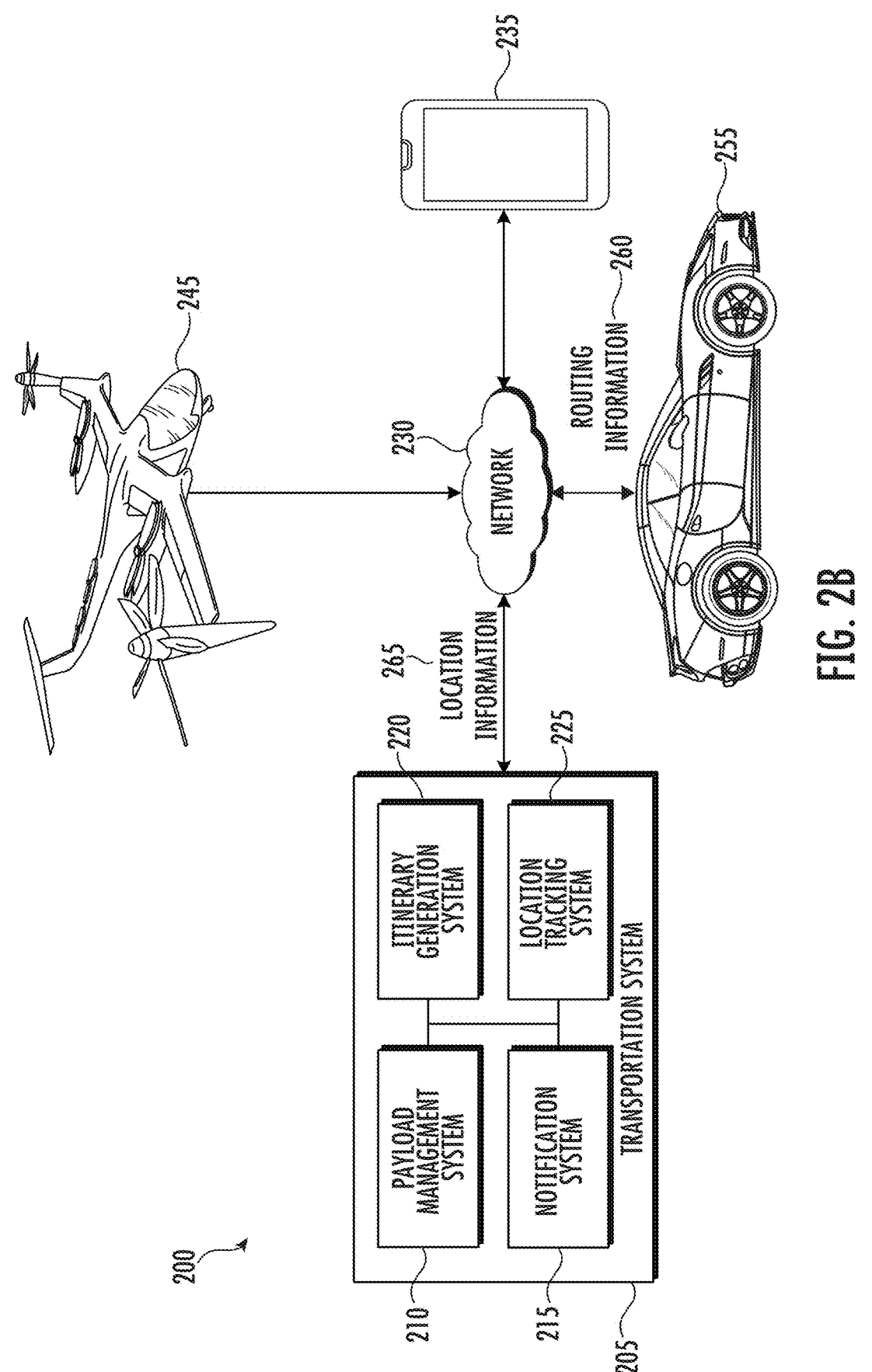
FIG. 2B illustrates the example transportation system of FIG. 2A with a ground vehicle according to an example.

The itinerary 270 may also provide the individual an option of having her payload item(s) transported to the destination via a separate vehicle such as, for example, a ground vehicle 255 (FIG. 2B). For example, and referring to FIG. 2B, FIG. 2B illustrates the example system 200 of FIG. 2A in which a ground vehicle 255 is used to transport one or more payload items associated with an individual from an origin to a destination according to an example.

When the computing system 205 determines, based on payload information 250 received from a VTOL aircraft 245, that the VTOL aircraft 245 does not have the capacity (e.g., weight capacity and/or storage capacity) for one or more payload items associated with the individual, the notification system 215 provides the individual an option to have one or more of her payload items transported to a destination via one or more ground vehicles 255. Although the example above indicates that this option is provided to the individual when payload information 250 associated with a VTOL aircraft 245 indicates that the VTOL aircraft 245 does not have capacity of the individual's payload item(s), the option of having one or more payload items transported from an origin to a destination may be provided to the individual at any point during a reservation process.

For example, as part of the data indicative of the potential itinerary request 240 (FIG. 2A), the individual provides input via the computing device 235 that the individual wants her payload item(s) to be picked up from a specified location (e.g., the individual's house, the origin vertiport, the individual's office). The individual may also provide a particular time or time frame (e.g., two hours before her scheduled departure time) that she wants the payload item(s) picked up.

When the individual has provided pick up information, the computing system 205 identifies a ground vehicle 255 for transporting the payload items from the origin to the destination. In some examples, the ground vehicle 255 is identified based on one or more ground vehicle characteristics. The ground vehicle characteristics may include a determined location of the ground vehicle 255, a determined cargo capacity (e.g., size of a trunk) of the ground vehicle (255), an anticipated destination of the ground vehicle 255 and the like. The notification system 215 provides location information 265 (including a pick up location, a drop off location and/or time frame information) instructions to the ground vehicle 255 and/or a computing device associated with a driver of the ground vehicle 255.

The ground vehicle 255 may be part of a fleet of vehicles (e.g., ground vehicles 255 and/or VTOL aircrafts 245) associated with a ridesharing service provider or one or more ridesharing service providers. In an example, the ground vehicle 255 that is identified may be a ground vehicle that transports the individual to the origin vertiport and subsequently transports the individual's payload items to a destination vertiport or to another specified destination.

In another example, the individual provides payload item drop off information to the computing system 205. For example, the individual may opt to have her payload item(s) dropped off at a particular location (e.g., her hotel, her home, her office). The individual may also specify a particular time or time frame she wants her payload item(s) to arrive at the particular location.

For example, if the VTOL aircraft 245 leaves a vertiport at 9:00 AM, the individual provides information indicating that she does not need her payload item(s) delivered to the particular destination until 5:00 PM. As such, the computing system 205 determines various routes (shown as routing information 260), that ground vehicle 255 should/can take to ensure the payload item(s) arrive at the particular destination at the requested time. In an example, the routing information 260 includes a time at which the ground vehicle 255 should depart based, at least in part, on current traffic conditions, location information associated with the ground vehicle 255 and so on.

As indicated above, the ground vehicle 255 may be associated with one or more ridesharing service providers. As such, while the ground vehicle 255 is being routed from an origin to a destination, the ground vehicle may be routed to one or more additional individuals that are looking to travel from an origin to a destination along (or near) the route identified by the routing information 260. In another example, the ground vehicle 255 that is transporting the payload item(s) may be routed to other individuals/locations in order to pick up additional payload item(s). In yet another example, the ground vehicle 255 may be restricted (e.g., by the ridesharing service provider) from picking up additional passengers and/or payload item(s).

In the examples described above, the individual that provided pick up and/or drop off information to the computing system 205 via a computing device 235. However, it is contemplated that the individual may bring her payload item(s) to the origin vertiport and/or reserve a flight on a VTOL aircraft 245 at the vertiport. When the individual arrives, she may specify (e.g., using a computing device, a check-in kiosk, talking with check-in officer) that her payload item(s) may be transported to a specified destination.

In another example, it may be determined during a check-in process that one or more of the individual's payload items need to be transported to a specified destination via a ground vehicle 255 based on payload information 250 associated with her assigned VTOL aircraft 245. The individual can provide (e.g., via a computing device associated with the individual) a desired drop off time and/or a desired drop off location to the computing system 205. This information can be input into a payload item drop off request generated via a software application running on a computing device. The computing system 205 can receive the payload item drop off request, the payload item drop off request being associated with a second, drop-off location for the payload item. Once this information is received, the computing system 205 identifies one or more ground vehicles 255 that can be used to transport the payload item(s).

In the event that a VTOL aircraft 245 does not have payload capacity to take all (or some) of an individual's payload items, the notification system 215 identifies other passengers on the VTOL aircraft 245 that may be willing to route their payload item(s) to a destination using a ground vehicle 255. In such an example, the notification system 215 may identify, generate and/or provide a message asking whether any of those passengers would be willing to have their payload item(s) transported to a specified destination via a ground vehicle 255. In some examples, this message is generated in response to input provided by the individual who wants all of her payload items on the VTOL aircraft 245. The passengers may be offered an incentive (e.g., a discount, a partial refund) to have their payload items transported via the ground vehicle 255. In an example, the individual that requested the message to be generated and sent is charged an additional fee.

In some examples, payload constraints of a VTOL aircraft 245 may be updated in real-time or substantially real-time. For example, as data indicative of the potential itinerary requests 240 (and associated payload item information) are received from various individuals (or as payload items arrive at a vertiport), the payload management system 210 may use this information to calculate or otherwise determine a remaining (estimated) amount of space and/or weight for the VTOL aircraft 245. This information may be provided to individuals that are booking itineraries and/or are arriving at the vertiport. This information may also be provided to the computing system 205 and subsequently used to identify whether individuals should or need to have one or more payload items transported to a destination via one or more ground vehicles 255.

The computing system 205, via the location tracking system 225, tracks the location of the individual's payload items that are being transported via the ground vehicle 255. In one example, the tracking is provided in real-time or substantially real-time. This can occur by obtaining sensor data acquired by a sensor of the vehicle transporting the item (e.g., GPS data from a GPS system of a ground-based vehicle). Thus, as the individual is travelling in the VTOL aircraft 245, she can track the location of her payload item(s) as the payload item(s) are being transported via the ground vehicle 255. The individual's location can also be tracked via sensor data acquired via a sensor of computing device 235 (e.g., GPS data of a GPS device). The location track system 225 can concurrently track the item and the individual and a user interface can display the locations of both the item and the individual at the same time.

Figure 3:
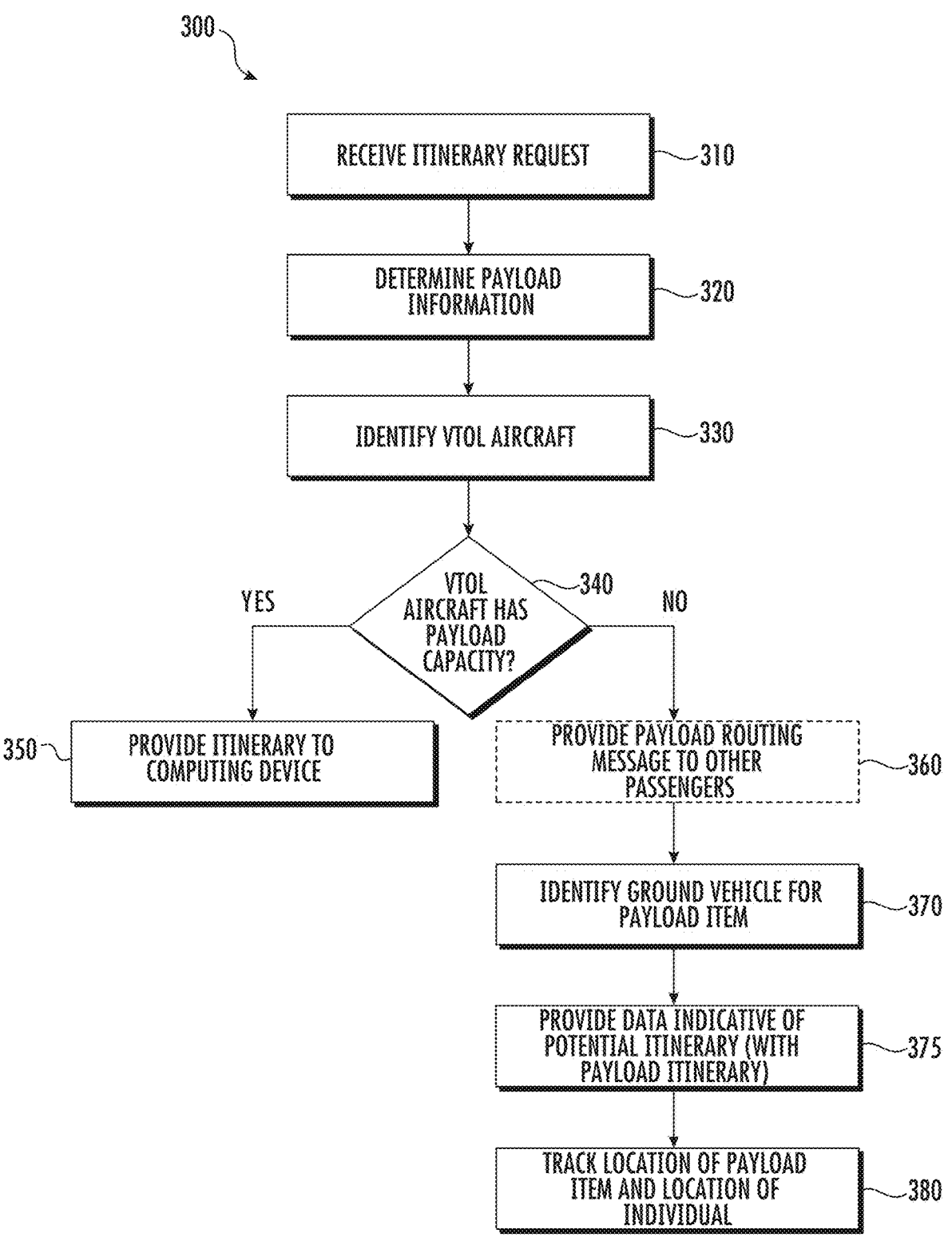
FIG. 3 illustrates a method for routing a payload item from an origin to a destination using a ground vehicle according to an example.

FIG. 3 illustrates a method 300 for routing a payload item from an origin to a destination using a ground vehicle according to an example. In an example, the method 300 is performed by the system 200 shown and described with respect to FIG. 2A and FIG. 2B and/or another system described herein (e.g., operations computing system 102A, etc.).

Method 300 begins when data indicative of the potential itinerary request is received (310). The data indicative of the potential itinerary request can request transportation for an individual. This can include, in some implementations, a request for a VTOL aircraft. In particular, the data indicative of the potential itinerary request can specify an origin and a destination. Even more particularly, the data indicative of the potential itinerary request can be associated with a computing device of an individual. For example, an individual accesses an application executing on her computing device and provides information regarding a desired origin, a desired destination, a desired departure time and/or a desired arrival time. The itinerary information may also include a starting location (e.g., a home of the individual) and/or a final destination (e.g., a hotel). In an example, the application is provided by one or more ridesharing service providers and/or one or more vehicle providers. In another example, the data indicative of the potential itinerary request is received at a kiosk or other computing device associated with or otherwise located at a vertiport.

In an example, the data indicative of the potential itinerary request also includes payload information. As such, the system accesses and/or determines (320) payload information for each payload item associated with the individual. The payload information may include one or more payload characteristics of one or more payload items. The payload information may include a weight of one or more payload items, a shape of one or more payload items, a size and/or size category (e.g., small, medium, large, etc.) of one or more items, dimensions of the one or more payload items, etc. In an example, the payload information is received by the system from a computing device associated with the individual. In another example, the weight and/or dimensions of the payload items are determined and/or received by one or more sensors (e.g., weight sensors and/or image sensors) at the vertiport when the individual arrives and begins a check-in and/or boarding process.

In an example, determining payload information (320) also includes accessing and/or determining payload capacity information of one or more VTOL aircraft associated with the origin and/or the destination. The payload information includes a payload capacity of the VTOL aircraft including a current or estimated payload weight of the VTOL aircraft and/or the current or estimated remaining volume of a storage compartment of the VTOL aircraft. In an example, the estimated payload weight and/or volume of the VTOL aircraft is based on historical information associated with one or more individuals that have checked-in, reserved a seat on the VTOL aircraft and/or have or are in the process of submitting a data indicative of the potential itinerary request. In another example, the estimated payload weight and/or estimated remaining volume is based on one or more past flights (including peak and non-peak travel times) from a specified origin to a specified destination.

Once payload information has been determined, a VTOL aircraft is identified (330). The VTOL aircraft may be identified based at least in part on the data indicative of the itinerary request, payload information, a potential itinerary and an associated VTOL aircraft. For example, the VTOL aircraft can be identified based on a number of different factors including, but not limited to, an amount of payload capacity remaining on the VTOL aircraft, the current (or anticipated) location of the VTOL aircraft, a flight time/route from an origin to a destination, an amount of passengers that have reserved a seat on the VTOL aircraft and the like.

Once the VTOL aircraft is identified, a determination (340) is made as to whether the VTOL aircraft has an available payload capacity for the payload item(s) associated with the individual. If it is determined that the VTOL aircraft has available payload capacity, data indicative of an itinerary is generated and provided (350) by the computing system for display via the computing device to the computing device associated with the individual.

However, if it is determined (340) that the VTOL aircraft does not have available payload capacity for the identified payload item(s), the system may (optionally and/or based on received input) provide (360) by the computing system for display via the computing device a payload routing message to one or more other passengers on the VTOL aircraft. As previously described, the payload routing message is a message in which the one or more other passengers can choose to route their payload item(s) from the vertiport (or other origin location) to a desired destination.

Additionally, if it is determined (340) that the VTOL aircraft does not have available payload capacity for the identified payload item(s), the system may identify (370) a ground vehicle that will transport the payload item(s) from the vertiport (or other origin location) to a desired destination. In one example, the system generates data indicative of a payload item itinerary for the payload item and associates the payload item itinerary with the individual. The payload item itinerary can include payload routing information for routing a payload item associated with the payload information from the origin to the destination using a vehicle other than the associated VTOL aircraft. For example, the payload routing information can include an estimated pick-up time, an estimated drop off time, the designated drop off location, a current location of the payload item and the like.

The system may provide (375) data indictive of the potential itinerary with a payload item itinerary to an individual associated with the request. For instance, the system may provide, for display via a computing device, data indicative of the potential itinerary. The data indicative of the potential itinerary can include payload routing information for routing a payload item associated with the payload information from the origin to the destination using a vehicle other than the associated VTOL aircraft. As described herein, this can allow a payload item itinerary to be viewed by an individual on the individual's computing device. In some implementations, the individual can select and/or approve of the payload itinerary (as indicated by the payload routing information) via user input associated with the user interface.

The payload item itinerary allows the system to track (380) the location of the payload item(s) substantially simultaneously with the location of the individual-even though the individual and the payload item are on different vehicles, travelling at different times and/or at different speeds. The tracking information is provided to the computing device associated with the individual in real-time or substantially real-time.

Figure 4:
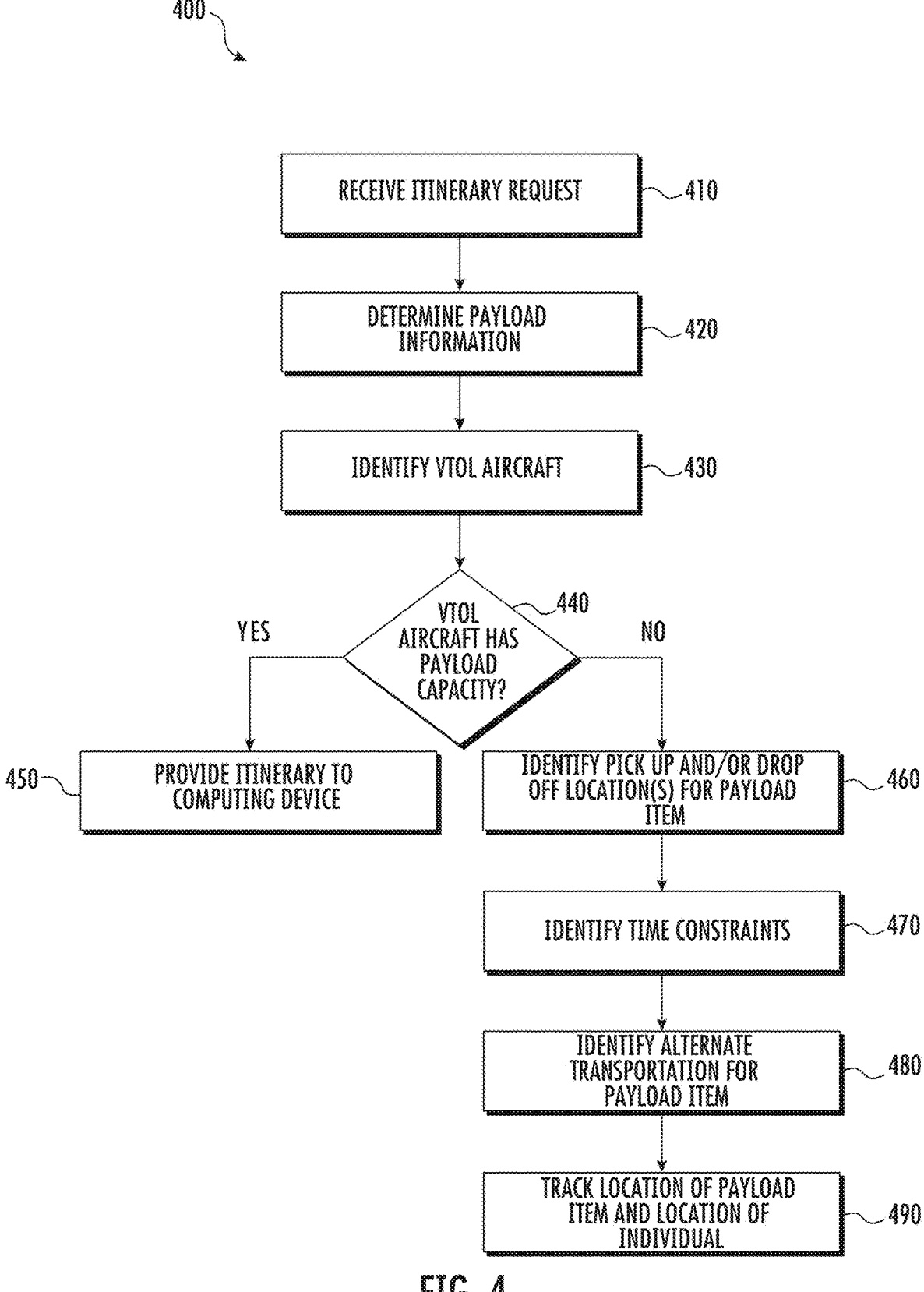
FIG. 4 illustrates a method for routing a payload item from an origin to a destination using a ground vehicle according to another example.

FIG. 4 illustrates a method 400 for routing a payload item from an origin to a destination using a ground vehicle according to another example. In an example, the method 400 is performed by the system 200 shown and described with respect to FIG. 2A and FIG. 2B.

Method 400 begins when data indicative of the potential itinerary request is received (410). The data indicative of the potential itinerary request may be similar to the data indicative of the potential itinerary requests described above with respect to FIG. 2A, FIG. 2B and FIG. 3. When the data indicative of the potential itinerary request is received, the system determines (420) payload information for each payload item associated with the individual such as previously described. In an example, determining payload information (420) includes receiving and/or determining payload capacity information for one or more VTOL aircraft associated with the origin and/or the destination specified in the data indicative of the potential itinerary request.

Once payload information has been determined, a VTOL aircraft is identified (430) such as previously described and a determination (440) is made as to whether the VTOL aircraft has an available payload capacity for the payload item(s) associated with the individual. If it is determined that the VTOL aircraft has available payload capacity, an itinerary is generated and provided (450) to the computing device associated with the individual.

However, if it is determined that the VTOL aircraft does not have payload capacity for the payload item(s), the system receives or otherwise identifies (460) pick up and/or drop off locations for the individual's payload item(s). In an example, a pick up location is a vertiport from which the VTOL aircraft will depart. In another example, the pick up location is specified by the individual. For example, the pick up location may be the individual's home. In some implementations, the individual may provide (e.g., via a computing device associated with the individual) a payload item pick up request indicating a location at which the payload item is to be picked up.

The drop off location may be a vertiport at which the VTOL aircraft is to arrive. In another example, the drop off location is specified by the individual. For example, the individual may request that her payload items be dropped off at her hotel at or near her destination.

In addition to identifying pick up and/or drop off locations, the system identifies (470) time constraints associated with the request. The time constraints may include a desired pick up time and/or a desired drop off time. In some examples, the system predicts or other provides a range of drop off times based, at least in part, on the desired pick up time, a distance from the specified pick up location to the specified drop off location, time of day, current traffic conditions, and/or a determined or anticipated number of available transport vehicles.

For example, the individual provides input to the system that indicates she wants her payload items to be picked up at her home at 9:00 AM. The individual also indicates that the desired destination for her payload items is her hotel which is approximately one hundred miles away from the origin. Based on the determined distance from the origin to the destination, the current time of day and/or current traffic conditions between the origin and the destination, the system determines that the payload items can be delivered to the individual's hotel any time after 2:00 PM.

In an example, the system will indicate that the payload items will be at the destination at or near the specified time. In another example, the individual selects a time for delivery (so long as the selected time is after the initially provided time). For example, although the payload items may be delivered to the individual's hotel at 2:00 PM, the individual may not be done with meetings until 6:00 PM. As such, the individual does not have a need for the payload items prior to 6:00 PM. Accordingly, the individual selects a 6:00 PM delivery time.

In another example, the individual may specify that the payload items need to arrive at a particular destination at a particular time. For example, the individual may indicate that she wants to pick up her payload items at a destination vertiport. The system determines that the estimated arrival time of the VTOL aircraft at the destination vertiport is 2:00 PM. Using this information (along with desired pick up location information, traffic information, alternate transportation information, etc.) the system determines that the individual's payload items need to be picked up at a particular time (e.g., no later than 9:00 AM). Once this information is determined, this information is provided to the computing device associated with the individual.

When the time constraints are determined, the system identifies (480) alternate transportation for the payload item. In one example, the alternate transportation is a ground vehicle provided by one or more ridesharing service providers. In another example, the alternate transportation is a truck, a train, a second VTOL aircraft or any combination thereof.

The system generates an itinerary for the payload item and the individual. This can include determining a first itinerary for the individual, the first itinerary being associated with a particular aircraft and being based, at least in part, on the origin, the destination and the payload information. Additionally, or alternatively, this can include determining a second itinerary for the individual, the second itinerary including payload routing information for routing a payload item associated with the payload information from a first location to a second location using a vehicle other than the particular aircraft. A payload item pick up request can be associated with the first location and/or a payload item drop off request can be associated with the second location. The itineraries include tracking information that allows the system to track (490) a location of the individual's payload item(s) substantially simultaneously with the location of the individual. In one example, the location of the individual is based on location information provided by the computing device of the individual and/or location information provided by the VTOL aircraft on which the individual is travelling. Location information of the payload item(s) is tracked using location information of the alternate vehicle on which the payload item(s) has been loaded and/or by other tracking technology (e.g., RFID tags, GPS). In an example, the location of the payload item(s) is provided to the computing device of the individual in real-time or substantially real-time. Data indicative of at least one of the first itinerary and the second itinerary can be provided for display via a user interface of a computing device associated with the individual.

Figure 5:
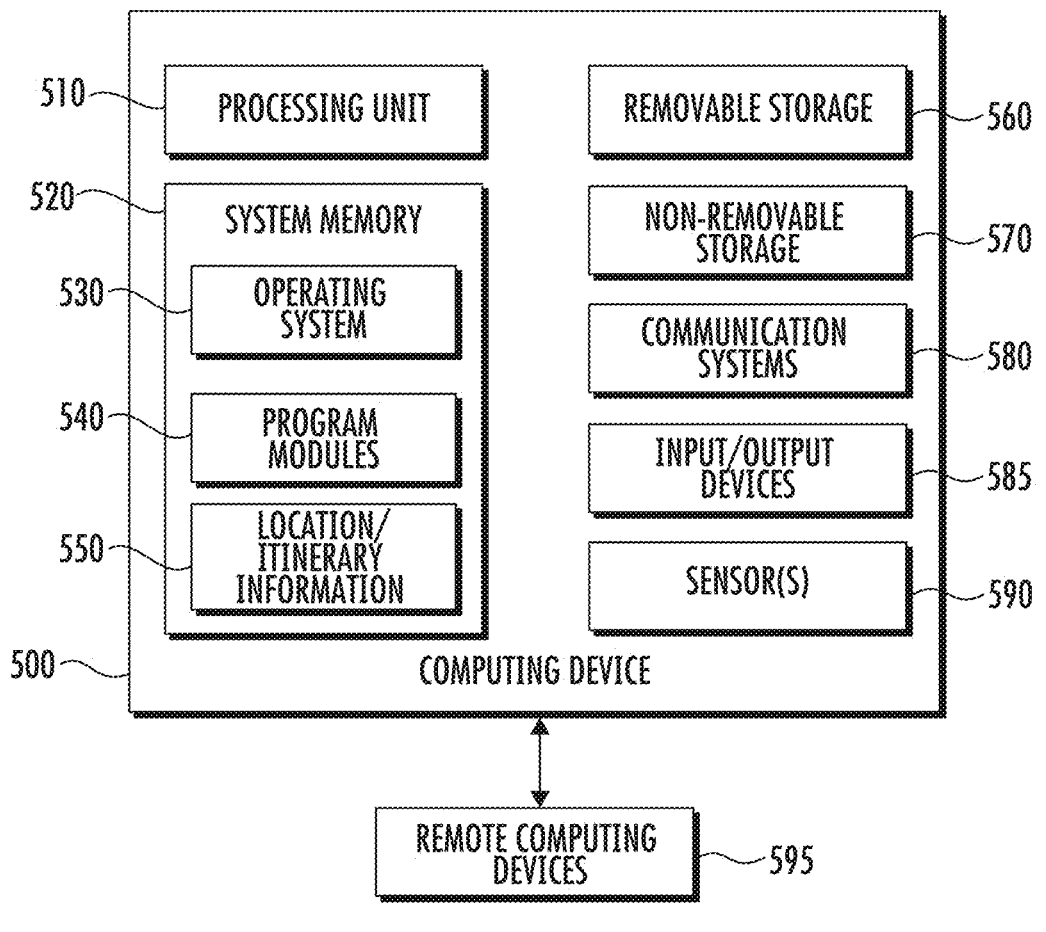
FIG. 5 illustrates an example computing device with which aspects of the present disclosure may be practiced.

FIG. 5 illustrates an example computing device with which aspects of the present disclosure may be practiced. The computing device 500 may be integrated with or associated with an aerial vehicle, such as aerial vehicle 150 and/or VTOL aircraft 245 discussed above. Additionally, a computing device 500 may be integrated or otherwise associated with various systems shown and described with respect to FIG. 1C, FIG. 2A, and FIG. 2B. As shown in FIG. 5, the physical components (e.g., hardware) of the computing are illustrated and these physical components may be used to practice the various aspects of the present disclosure.

The computing device 500 may include at least one processing unit 510 and a system memory 520 or memory resource. The system memory 520 or memory resource may include, but is not limited to, volatile storage (e.g., random access memory), non-volatile storage (e.g., read-only memory), flash memory, or any combination of such memories. The system memory 520 may also include an operating system 530 that control the operation of the computing device 500 and one or more program modules 540. The program modules 540 may be responsible for gathering, receiving and/or determining location/itinerary information 550 and/or generating routes, tracking information and/or itineraries as described above. The system memory 520 may also store this information or otherwise provide access to this information. A number of different program modules and data files may be stored in the system memory 520. While executing on the processing unit 510, the program modules 540 may perform the various operations described above.

The computing device 500 may also have additional features or functionality. For example, the computing device 500 may include additional data storage devices (e.g., removable and/or non-removable storage devices) such as, for example, magnetic disks, optical disks, or tape. These additional storage devices are labeled as a removable storage 560 and a non-removable storage 570.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 500 on the single integrated circuit (chip). The disclosure may also be practiced using other technologies capable of performing logical operations such as, for example, AND, OR, and NOT, including but not limited to mechanical, optical, fluidic, and quantum technologies. In addition, examples of the disclosure may be practiced using a computing device associated with or integrated with the electric vehicle and/or in any other circuits or systems.

The computing device 500 may include one or more communication systems 580 that enable communication with and/or among client and computing devices, aerial vehicles, other vehicles, a transportation system, remote computing devices 595, a network service and the like. Examples of communication systems 580 include, but are not limited to, radio frequency (RF) transmitter, receiver, and/or transceiver circuitry, a Controller Area Network (CAN) bus, a universal serial bus (USB), parallel, and/or serial ports.

The computing device 500 may also have one or more input devices and/or one or more output devices shown as input/output devices 585. These input/output devices 585 may include a keyboard, a sound or voice input device, haptic devices, a touch, force and/or swipe input device, a display, speakers, etc. The aforementioned devices are examples and others may be used.

The computing device 500 may also include one or more sensors 590. The sensors may be used to detect or otherwise provide information about the operating condition of the computing device (e.g., its location, heading, surroundings, proximity to telecommunication nodes, etc.).

The term computer-readable media as used herein may include computer storage media. Computer storage media may include volatile and nonvolatile, removable and non-removable media implemented in any method or technology for storage of information, such as computer readable instructions, data structures, or program modules.

The system memory 520, the removable storage 560, and the non-removable storage 570 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6:
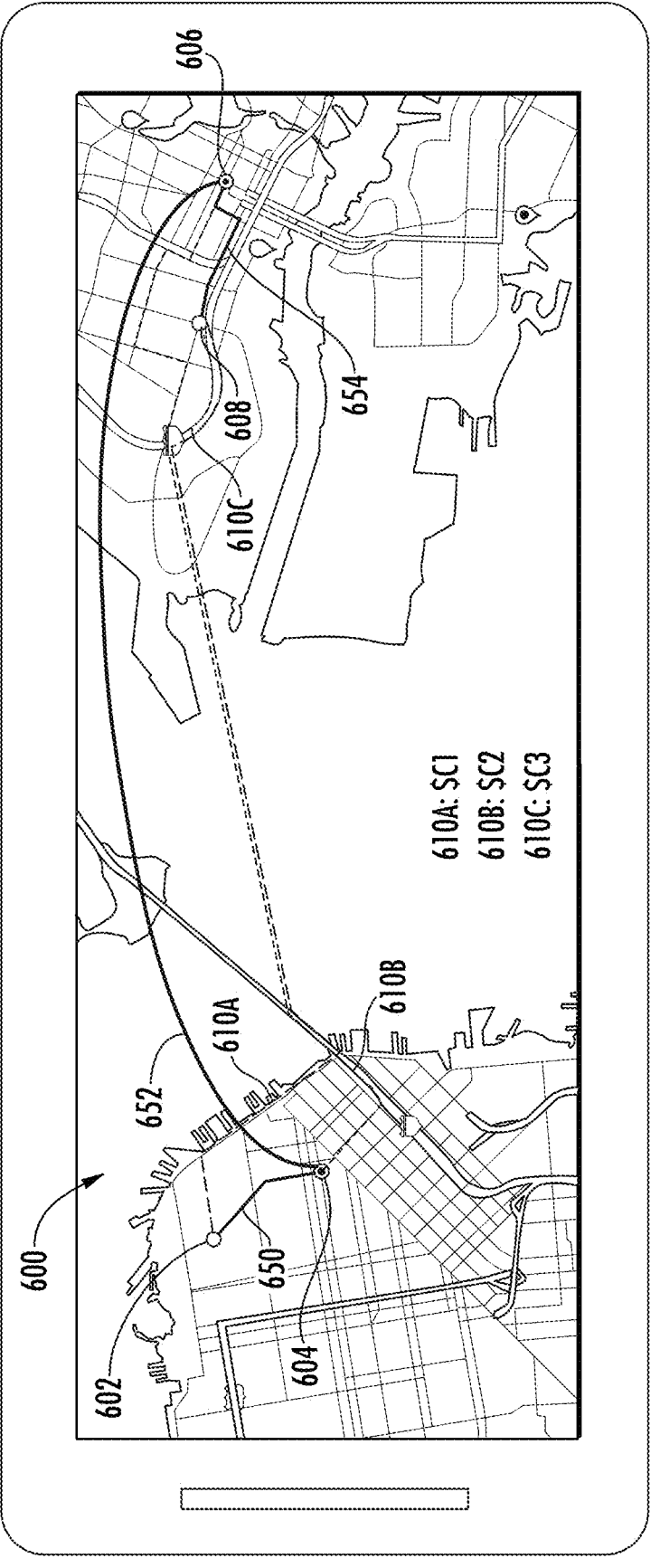
FIG. 6 depicts an example user interface displaying a multi-modal itinerary according to example embodiments of the present disclosure on a user device.

FIG. 6 depicts an example user interface 600 displaying a multi-modal itinerary according to example embodiments of the present disclosure on a user device. The example multi-modal itinerary shown in FIG. 6 is for an individual and includes three legs, although more or less legs can be included. In this example, a first leg 650 includes transport for the individual from an origin 602 to a first transportation node 604 (e.g., a first vertiport). The first leg 650 can include ground-based vehicle transportation. A second leg 652 includes transport for the individual from the first transportation node 604 to a second transportation node 606 (e.g., a second vertiport). The second leg 652 can include aerial vehicle based transportation (e.g., via VTOL aircraft). A third leg 654 includes transport for the individual from the second transportation node 606 to a destination 608. The third leg 654 can include ground-based vehicle transportation.

As described herein, the potential itinerary for the individual can include payload routing information. This can include, for example, alternate payload itineraries bypassing aerial transportation. This can occur, for example, when the payload item associated with the user would cause the assigned aerial vehicle to exceed a capacity threshold (e.g., due to item weight, size, number, etc.). A computing system (e.g., system 200, 102A, etc.) can provide data indicative of one or more candidate payload item itineraries 610A-C for display via a user interface of a computing device. This can allow an individual to select a payload item itinerary from among the candidate payload item itineraries 610A-C.

A computing device associated with the individual can receive the data indicative of the candidate payload item itineraries 610A-C and present them via a user interface on a display device. The candidate payload item itineraries 610A-C can include transport of the payload item by a vehicle other than the aerial vehicle included in the individual's itinerary (e.g., of second leg 652).

In some implementations, the candidate payload item itineraries 610A-C can be associated with different locations than one another. For example, a first candidate payload item itinerary 610A can include transport of the payload item from the origin 602 to the destination 608. A second candidate payload item itinerary 610B can include transport of the payload item from the first transportation node 604 to the second transportation node 606. A third candidate payload item itinerary 610C can include transport of the payload item from the first transportation node 604 to the destination 608.

In some implementations, the candidate payload item itineraries 610A-C can be associated with different timing than one another. First example, one candidate payload item itinerary may be faster (e.g., from start to finish) than the other candidates. The user interface 600 can present the timing for each for the individual to view.

In some implementations, the candidate payload item itineraries 610A-C can be associated with different costs. For example, the first candidate payload item itinerary 610A can be associated with a first cost C1, which is different than a second cost C2 associated with the second candidate payload item itinerary 610B, which is different than a third cost C3 associated with the third candidate payload item itinerary 610C. The user interface 600 can present the cost for each for the individual to view.

In some implementation, at least one of the candidate payload item itineraries 610A-C can include a different transportation modality than the other candidate payload item itineraries 610A-C. For example, the third candidate payload item itineraries 610C can include transport via motorcycle, while the first and second candidate payload item itineraries 610A-B can include transport via car or truck.

An individual can select a candidate payload item itineraries 610A-C by providing user input associated with the user interface (e.g., a touch selection). The computing device can provide data indicative of this selection to another computing system (e.g., system 200, 102A, etc.), which can coordinate the transportation accordingly. As described herein, the user interface can provide a location of the item along its payload item itinerary concurrently with the location of the individual along the individual's itinerary.

Although not shown, the candidate payload item itineraries can include various alternative and can involve a multitude of other potential diverging paths including the payload being transported to a destination different from the passenger (e.g., the payload can be delivered to a hotel while the passenger goes to an office building).

The candidate payload item itineraries 610A-C can be provided to an individual at various times. For example, candidate payload item itineraries 610A-C can be provided to an individual prior to the individual selecting or purchasing a particular itinerary. Even more particularly, the individual can select a preferable payload item itinerary prior to or concurrently to selecting or purchasing a particular itinerary for the individual.

In some embodiments, the example set of candidate payload item itineraries can be provided to an individual after the individual selects or purchases a particular itinerary for themself. For example, an individual can be provided with the selectable candidate payload item itineraries upon selecting or purchasing an itinerary for themself regardless of total aircraft weight determination. As another example, only individuals exceeding a predetermined payload weight limit or volume limit (e.g., due to payload item size/shape, etc.) can be provided with selectable candidate payload item itineraries. As yet another example, upon determination that an aircraft weight limit or volume/space limit has been exceeded, aerial transportation facility workers at an aerial transportation facility located at a transport node may request one or more passengers to volunteer to alternatively route their payload items. The selectable candidate payload item itineraries can then be provided to user devices associated with the one or more volunteers. As yet another example, upon determination that an aircraft weight limit or volume limit has been exceeded, every individual can be provided with selectable candidate payload item itineraries prior to individuals volunteering for alternate payload itineraries. In particular, every individual can be provided with the selectable candidate payload item itineraries until enough individuals volunteer to lower the aircraft weight or volume below the total weight or volume/space limit. Even more particularly, the user interface may indicate how much weight or volume/space must be redirected by alternate payload itineraries.

In some implementations, the user can indicate a benefit associated with particular payload itineraries (e.g., a discount, a partial refund, or other compensation). In particular, the benefit (e.g., discount, voucher, reward points, etc.) associated with a particular candidate payload item itinerary can be displayed via the user interface to indicate what benefit an individual would receive upon selecting a particular payload item itinerary.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Computing tasks discussed herein as being performed at one computing device/system can instead be performed at another computing device/system, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices. Moreover, examples and functions describing computing devices/systems receiving certain data/information is not intended to be limiting. The computing devices/systems can access, determine, generate, retrieve, pull, and/or otherwise obtain such data and/or information and such descriptions are meant to reflect these approaches.

What is claimed is:

1. A method for real-time payload distribution for vertical take-off and landing (VTOL) aircraft payloads, the method comprising:

accessing, by a first computing system, a first request from a computing device associated with the first request, the first request associated with data indicative of an origin and a destination and data indicative of payload information for a first payload item;

accessing, by the first computing system, data indicating an availability of a VTOL aircraft and a remaining payload capacity of the VTOL aircraft;

computing, by the first computing system and based on the remaining payload capacity of the VTOL aircraft, first payload routing information for transporting the first payload item using the VTOL aircraft;

assigning, by the first computing system, the VTOL aircraft to the first request;

transmitting, by the first computing system, instructions for transporting the first payload item using the VTOL aircraft according the first payload routing information;

updating, by the first computing system, the remaining payload capacity of the VTOL aircraft based on the data indicative of payload information for the first payload item;

accessing, by the first computing system, a second request from a computing device associated with the second request, the second request associated with data indicative of the origin and the destination and data indicative of payload information for a second payload item;

computing, by the first computing system and based on the updated remaining payload capacity of the VTOL aircraft, second payload routing information for transporting the second payload item other than by the VTOL aircraft;

transmitting, by the first computing system, data indicative of the second payload routing information to the computing device associated with the second request;

responsive to data indicative of approval, by the computing device associated with the second request, of the second payload routing information:

assigning, by the first computing system, the VTOL aircraft to the second request to cause the VTOL aircraft to fly from the origin to the destination without the second payload item; and transmitting, by the first computing system, instructions for transporting the second payload item using a vehicle other than the VTOL aircraft according the second payload routing information; or responsive to data indicative of rejection, by the computing device associated with the second request, of the second payload routing information;

assigning, by the first computing system, a different VTOL aircraft to the second request; and transmitting, by the first computing system, instructions for transporting the second payload item using the different VTOL aircraft to cause the different VTOL aircraft to fly from the origin to the destination with the second payload item.

2. The method of claim 1, comprising:

receiving, by the first computing system and from the computing device associated with the second request, an image depicting the second payload item;

processing, by the first computing system, the image to estimate one or more dimensions of the payload item; and based on the estimated one or more dimensions, computing, by the first computing system and based on the updated remaining payload capacity of the VTOL aircraft, the second payload routing information for transporting the second payload item other than by the VTOL aircraft.

3. The method of claim 1, comprising:

tracking, by the first computing system, based on sensor data associated with the second payload item or the vehicle transporting the second payload item, a location of the second payload item as the second payload item travels to a destination of the second payload item; and providing, by the first computing system for display via the computing device associated with the second payload item, data indicative of the location of the location of the second payload item as the second payload item travels to the destination of the second payload item.

4. The method of claim 1, comprising:

transmitting, by the first computing system, with the data indicative of the second payload routing information to the computing device associated with the second request, data indicative of third payload routing information for transporting the second payload item using a different VTOL aircraft.

5. The method of claim 1, wherein computing, by the first computing system and based on the updated remaining payload capacity of the VTOL aircraft, second payload routing information for transporting the second payload item other than by the VTOL aircraft comprises:

computing, by the first computing system and based on the payload information for the second payload item, that the second payload item would cause the VTOL aircraft to exceed a payload constraint.

6. The method of claim 1, comprising:

receiving the data indicative of approval; and responsive to the data indicative of approval, by the computing device associated with the second request, of the second payload routing information:

assigning, by the first computing system, the VTOL aircraft to the second request; and transmitting, by the first computing system, the instructions for transporting the payload item using a vehicle other than the VTOL aircraft according the second payload routing information.

7. The method of claim 1, wherein the payload information associated with the second payload item comprises at least one of a weight, a size, a shape, or a volume of the payload item.

8. The method of claim 7, wherein the estimated one or more dimensions describe a size, a shape, or a volume of the payload item.

9. The method of claim 1, comprising:

receiving the data indicative of rejection; and responsive to the data indicative of rejection, by the computing device associated with the second request, of the second payload routing information;

assigning, by the first computing system, the different VTOL aircraft to the second request; and transmitting, by the first computing system, the instructions for transporting the payload item using the different VTOL aircraft.

10. The method of claim 9, comprising:

transmitting, by the first computing system, with the data indicative of the second payload routing information to the computing device associated with the second request, data indicative of third payload routing information for transporting the second payload item using a different VTOL aircraft.

11. The method of claim 10, wherein the data indicative of rejection, by the computing device associated with the second request, of the second payload routing information corresponds to an approval of the third payload routing information.

12. A computing system for real-time payload distribution for vertical take-off and landing (VTOL) aircraft payloads, the computing system comprising:

one or more computing devices; and one or more non-transitory computer readable media that store instructions that, when executed by the one or more computing devices, cause the one or more computing devices to perform operations, the operations comprising:

accessing a first request from a computing device associated with the first request, the first request associated with data indicative of an origin and a destination and data indicative of payload information for a first payload item;

accessing data indicating an availability of the VTOL aircraft and a remaining payload capacity of the VTOL aircraft;

computing, based on the remaining payload capacity of the VTOL aircraft, first payload routing information for transporting the first payload item using the VTOL aircraft;

assigning the VTOL aircraft to the first request;

transmitting instructions for transporting the first payload item using the VTOL aircraft according the first payload routing information;

updating the remaining payload capacity of the VTOL aircraft based on the data indicative of payload information for the first payload item;

accessing a second request from a computing device associated with the second request, the second request associated with data indicative of the origin and the destination and data indicative of payload information for a second payload item;

computing, based on the updated remaining payload capacity of the VTOL aircraft, second payload routing information for transporting the second payload item other than by the VTOL aircraft;

transmitting data indicative of the second payload routing information to the computing device associated with the second request;

responsive to data indicative of approval, by the computing device associated with the second request, of the second payload routing information:

assigning the VTOL aircraft to the second request to cause the VTOL aircraft to fly from the origin to the destination without the second payload item; and transmitting instructions for transporting the second payload item using a vehicle other than the VTOL aircraft according the second payload routing information; or responsive to data indicative of rejection, by the computing device associated with the second request, of the second payload routing information:

assigning a different VTOL aircraft to the second request; and transmitting instructions for transporting the second payload item using the different VTOL aircraft to cause the different VTOL aircraft to fly from the origin to the destination with the second payload item.

13. The computing system of claim 12, the operations comprising:

receiving, from the computing device associated with the second request, an image depicting the second payload item;

processing the image to estimate one or more dimensions of the payload item; and based on the estimated one or more dimensions, computing, based on the updated remaining payload capacity of the VTOL aircraft, the second payload routing information for transporting the second payload item other than by the VTOL aircraft.

14. The computing system of claim 12, wherein computing, based on the updated remaining payload capacity of the VTOL aircraft, second payload routing information for transporting the second payload item other than by the VTOL aircraft comprises;

computing, based on the payload information for the second payload item, that the second payload item would cause the VTOL aircraft to exceed a payload constraint.

15. The computing system of claim 12, the operations comprising:

receiving the data indicative of approval; and responsive to the data indicative of approval, by the computing device associated with the second request, of the second payload routing information:

assigning the VTOL aircraft to the second request; and transmitting the instructions for transporting the payload item using a vehicle other than the VTOL aircraft according the second payload routing information.

16. The computing system of claim 12, wherein the payload information associated with the second payload item comprises at least one of a weight, a size, a shape, or a volume of the payload item.

17. The computing system of claim 16, wherein the estimated one or more dimensions describe a size, a shape, or a volume of the payload item.

18. The computing system of claim 12, the operations comprising:

receiving the data indicative of rejection; and responsive to the data indicative of rejection, by the computing device associated with the second request, of the second payload routing information;

assigning the different VTOL aircraft to the second request; and transmitting the instructions for transporting the payload item using the different VTOL aircraft.

19. The computing system of claim 18, the operations comprising:

transmitting with the data indicative of the second payload routing information to the computing device associated with the second request, data indicative of third payload routing information for transporting the second payload item using a different VTOL aircraft;

wherein the data indicative of rejection, by the computing device associated with the second request, of the second payload routing information corresponds to an approval of the third payload routing information.

20. One or more non-transitory computer readable media that store instructions that, when executed by one or more computing devices, cause the one or more computing devices to perform operations, the operations comprising:

accessing a first request from a computing device associated with the first request, the first request associated with data indicative of an origin and a destination and data indicative of payload information for a first payload item;

accessing data indicating an availability of a vertical take-off and landing (VTOL) aircraft and a remaining payload capacity of the VTOL aircraft;

computing, based on the remaining payload capacity of the VTOL aircraft, first payload routing information for transporting the first payload item using the VTOL aircraft;

assigning the VTOL aircraft to the first request;

transmitting instructions for transporting the first payload item using the VTOL aircraft according the first payload routing information;

updating the remaining payload capacity of the VTOL aircraft based on the data indicative of payload information for the first payload item;

accessing a second request from a computing device associated with the second request, the second request associated with data indicative of the origin and the destination and data indicative of payload information for a second payload item;

computing, based on the updated remaining payload capacity of the VTOL aircraft, second payload routing information for transporting the second payload item other than by the VTOL aircraft;

transmitting data indicative of the second payload routing information to the computing device associated with the second request;

responsive to data indicative of approval, by the computing device associated with the second request, of the second payload routing information:

assigning the VTOL aircraft to the second request to cause the VTOL aircraft to fly from the origin to the destination without the second payload item; and transmitting instructions for transporting the second payload item using a vehicle other than the VTOL aircraft according the second payload routing information; or responsive to data indicative of rejection, by the computing device associated with the second request, of the second payload routing information:

assigning a different VTOL aircraft to the second request; and transmitting instructions for transporting the second payload item using the different VTOL aircraft to cause the different VTOL aircraft to fly from the origin to the destination with the second payload item.

* * * * *